(12) United States Patent
Yearsley et al.

(10) Patent No.: US 12,543,720 B2
(45) Date of Patent: Feb. 10, 2026

(54) SYSTEMS AND METHODS FOR MINIMIZING PHORID FLY INFESTATION IN CEMETERY MAUSOLEUM BUILDINGS

(71) Applicant: Ensure-A-Seal, Inc., Export, PA (US)

(72) Inventors: David A. Yearsley, Export, PA (US); Marc R. Yearsley, Philadelphia, PA (US); Jordan Yearsley, University City, MO (US); William M. Matro, Latrobe, PA (US)

(73) Assignee: Ensure-A-Seal, Inc., Export, PA (US)

( * ) Notice: Subject to any disclaimer, the term of this patent is extended or adjusted under 35 U.S.C. 154(b) by 0 days.

(21) Appl. No.: 18/666,107

(22) Filed: May 16, 2024

(65) Prior Publication Data

US 2024/0381865 A1 Nov. 21, 2024

Related U.S. Application Data

(60) Provisional application No. 63/466,817, filed on May 16, 2023.

(51) Int. Cl.
*A01M 1/24* (2006.01)
*A01M 1/20* (2006.01)
(Continued)

(52) U.S. Cl.
CPC ............... *A01M 1/24* (2013.01); *A01M 1/20* (2013.01); *A01M 1/245* (2013.01); *A01M 29/34* (2013.01);
(Continued)

(58) Field of Classification Search
CPC ............................. A01M 1/24; A01M 1/245
See application file for complete search history.

(56) References Cited

U.S. PATENT DOCUMENTS

| 649,448 | A | * | 5/1900 | Hammond | ............ | A01M 1/106 |
| | | | | | | 119/664 |
| 1,059,253 | A | * | 4/1913 | Wimbish | ............... | A01M 1/223 |
| | | | | | | 43/119 |

(Continued)

FOREIGN PATENT DOCUMENTS

| CN | 106386748 | A | * | 2/2017 | ............ | A01M 1/223 |
| CN | 110115263 | | | 8/2019 | | |

(Continued)

OTHER PUBLICATIONS

Merged translation of DE-10153248-A1 (Year: 2003).*

(Continued)

*Primary Examiner* — Morgan T Jordan
(74) *Attorney, Agent, or Firm* — Reed Smith LLP; Matthew P. Frederick; Cheryl L. Gastineau

(57) ABSTRACT

Systems and methods for minimizing phorid fly infestation in cemetery mausoleum buildings are provided. An insecticide can be applied to electrostatically charged screens, which can be shaped to fit various openings in mausoleum buildings, including openings comprised by windows, crypt vents, roof vents, and floor drains. Standalone units can also be installed having insecticide applied electrostatically charged screens. The screens can be placed to interrupt the phorid fly mating and egg-laying process to limit or prevent phorid fly infestation in mausoleum buildings.

20 Claims, 22 Drawing Sheets

(51) Int. Cl.
*A01M 29/34* (2011.01)
*E04H 13/00* (2006.01)

(52) U.S. Cl.
CPC ..... *E04H 13/005* (2013.01); *A01M 2200/012* (2013.01)

(56) References Cited

U.S. PATENT DOCUMENTS

| | | | | |
|---|---|---|---|---|
| 1,357,619 | A * | 11/1920 | Davis | A01M 1/24 43/119 |
| 1,730,608 | A * | 10/1929 | Frost | A01M 1/223 D25/48.8 |
| 1,754,748 | A * | 4/1930 | Frost | A01M 1/24 43/112 |
| 1,848,625 | A * | 3/1932 | Hager | A01M 1/223 256/10 |
| 1,879,495 | A * | 9/1932 | Renwick | A01M 1/223 43/112 |
| 2,030,310 | A * | 2/1936 | McWilliams | A01M 1/223 43/112 |
| 3,714,733 | A * | 2/1973 | Madonna | A01M 29/34 43/131 |
| 4,300,306 | A * | 11/1981 | Hudgin | A01M 1/223 256/10 |
| 5,050,338 | A * | 9/1991 | Doakley | A01M 1/245 43/132.1 |
| 5,148,627 | A * | 9/1992 | Thomas | A01M 1/2055 43/132.1 |
| 5,987,810 | A | 11/1999 | Nash | |
| 6,041,543 | A | 3/2000 | Howse | |
| 6,341,444 | B1 * | 1/2002 | Cina | A01G 13/10 43/119 |
| 6,763,875 | B2 * | 7/2004 | Gronlund | E06B 9/52 160/371 |
| 6,874,273 | B1 * | 4/2005 | Weisenburg, III | A01M 1/04 43/119 |
| 7,712,247 | B2 | 5/2010 | Wijenberg et al. | |
| 8,042,598 | B2 | 10/2011 | Bredemus et al. | |
| 9,510,583 | B2 | 12/2016 | Yamauchi et al. | |
| 2004/0128903 | A1 * | 7/2004 | Wexler | A01M 29/34 43/122 |
| 2009/0277073 | A1 | 11/2009 | Chen | |
| 2014/0057513 | A1 | 2/2014 | Bräuer et al. | |
| 2014/0201904 | A1 * | 7/2014 | Sapara, Jr. | A01M 1/2011 43/132.1 |
| 2016/0040820 | A1 * | 2/2016 | Morris | F15D 1/04 138/89 |
| 2016/0050901 | A1 | 2/2016 | Pugh | |
| 2016/0183512 | A1 * | 6/2016 | Chan | A01M 1/24 43/98 |
| 2018/0228141 | A1 * | 8/2018 | Blackford | A61K 9/06 |
| 2018/0274294 | A1 * | 9/2018 | Hoffman | A01M 1/24 |
| 2021/0015350 | A1 | 1/2021 | Butte et al. | |

FOREIGN PATENT DOCUMENTS

| | | | | |
|---|---|---|---|---|
| CN | 110292032 | A * | 10/2019 | A01M 1/223 |
| DE | 10153248 | A1 * | 5/2003 | A01M 1/24 |
| EP | 2859794 | | 4/2015 | |
| KR | 20120065650 | A * | 6/2012 | E06B 9/52 |
| KR | 20140056928 | A * | 5/2014 | A01M 1/226 |
| KR | 20190072732 | A * | 6/2019 | A01M 1/24 |
| KR | 20200086194 | A * | 7/2020 | A01M 1/24 |
| KR | 20220152416 | A * | 11/2022 | G06Q 50/02 |
| WO | 19990044418 | | 9/1999 | |

OTHER PUBLICATIONS

Merged translation of KR-20120065650-A (Year: 2012).*
Merged translation of KR-20140056928-A (Year: 2014).*
Merged translation of CN-106386748-A (Year: 2017).*
Merged translation of KR-20190072732-A (Year: 2019).*
Merged translation of CN-110292032-A (Year: 2019).*
Merged translation of KR-20200086194-A (Year: 2020).*
Merged translation of KR-20220152416-A (Year: 2022).*
Andriessen et al., "Electrostatic coating enhances bioavailability of insecticides and breaks pyrethroid resistance in mosquitoes," PNAS, Sep. 29, 2015, vol. 112, No. 39, p. 12081-12086 https://scholar.google.com/scholar?output=instlink&q=info:b4xL.4C7K8LKJ:scholar.google.com/&hl=en&as_sdt=0,10&scillfp=4942819370199486569&oi=lle.
Cordel et al., "The behavior of Anopheles gambiae s.l. on bendiocarb powder treated electrostatic net in eave tubes: Observations using a simple novel video surveillance system suited for the field," AMCA 82nd Annual Meeting, Feb. 1, 2016, Savannah, Georgia, USA; https://www.researchgate.net/profile/Andreas-Rose-2/publication/294580115_The_behavior_of_Anopheles_gambiae_sl_on_bendiocarb_powder_treated_electrostatic_net_in_eave_tubes_Observations_using_a_simple_novel_video_surveillance_system_suited_for_the_field/.
Kakutani et al., "Practical Application of an Electric Field Screen to an Exclusion of Flying Insect Pests and Airborne Fungal Conidia from Greenhouses with a Good Air Penetration," Journal of Agricultural Science, vol. 4, No. 5; Apr. 1, 2012; http://electric-field-screen.org/Journal%20of%20Agricultural%20Science%201.pdf.
Matsuda et al., "Safe housing ensured by an electric field screen that excludes insect-net permeating haematophagous mosquitoes carrying human pathogens," Journal of Physics: Conference Series, 646 (2015) 012002; https://iopscience.iop.org/article/10.1088/1742-6596/646/1/012002/pdf.
Nonomura et al., "An electric field strongly deters whiteflies from entering window-open greenhouses in an electrostatic insect exclusion strategy," Eur J Plant Pathol (Oct. 12, 2012) 134:661-670; http://electric-field-screen.org/European%20Journal%20of%20Plant%20Pathology.pdf.
Oumbouke et al., "Screening and field performance of powder-formulated insecticides on eave tube inserts against pyrethroid resistant Anopheles gambiae s.l.: an investigation into 'actives' prior to a randomized controlled trial in Côte d'Ivoire," Malar J (Oct. 22, 2018) 17:374; https://link.springer.com/article/10.1186/s12936-018-2517-9.
Takikawa et al., "A Promising Physical Pest-Control System Demonstrated in a Greenhouse Equipped with Simple Electrostatic Devices that Excluded all Insect Pests," Preprints May 21, 2019, 2019050256 (doi: 10.20944/preprints201905.0256.v1); https://www.preprints.org/manuscript/201905.0256/download/final_file.
Wilkins et al., "Long-Lasting Insecticide-Incorporated Netting and Interception Traps at Pilot-Scale Warehouses and Commercial Facilities Prevents Infestation by Stored Product Beetles," Frontiers in Sustainable Food Systems, Jan. 11, 2021, vol. 4, Article 561820; https://www.frontiersin.org/articles/10.3389/fsufs.2020.561820/full.
Mulhollem, Jeffrey, "Penn State entomologists devise a system to control mushroom phorid flies"; Jan. 28, 2021; https://www.psu.edu/news/impact/story/penn-state-entomologists-devise-system-control-mushroom-phorid-flies/.

* cited by examiner

SYSTEMS AND METHODS FOR MINIMIZING PHORID FLY INFESTATION IN CEMETERY MAUSOLEUM BUILDINGS

CROSS-REFERENCE TO RELATED APPLICATION

This application claims the benefit under 35 U.S.C. § 119(e) of the earlier filing date of U.S. Provisional Patent Application No. 63/466,817, filed May 16, 2023, the disclosures of which is incorporated by reference herein.

BACKGROUND

The present invention relates to systems and methods for managing the environment in cemetery mausoleum buildings, particularly pest and insect management.

SUMMARY

Embodiments provide a method for minimizing phorid fly activity. The method can include applying an insecticide to a plurality of first electrostatic charged screens. The method can also include fitting each of the first electrostatic charged screens to a crypt vent in each of a plurality of crypts arranged in an interior of a mausoleum. The crypt vents can fluidly couple interiors of the plurality of crypts and the interior of the mausoleum. The method can also include applying the insecticide to a plurality of second electrostatic charged screens. The method can also include fitting each of the second electrostatic charged screens to each of a plurality of roof vents of the mausoleum. The roof vents can fluidly couple the interior of the mausoleum and an ambient exterior of the mausoleum.

In some embodiments, the method also includes placing a cover over each of the plurality of second electrostatic charged screen fit to each of the plurality of roof vents.

In some embodiments, fitting each of the first electrostatic charged screens to a crypt vent further includes fitting each of the first electrostatic charged screens into an end of a first screen housing comprising a first frustoconical shaped side wall, and inserting the first screen housing into the crypt vent.

In some embodiments, fitting each of the second electrostatic charged screens to a roof vent further includes fitting each of the second electrostatic charged screens into an end of a second screen housing comprising a frustoconical second shaped side wall, and inserting the second screen housing into the roof vent.

In some embodiments, the method further includes applying the insecticide to a plurality of third electrostatic charged screens; fitting each of the third electrostatic charged screens to a crypt drain in each of the plurality of crypts, the crypt drains configured to fluidly couple with the plurality of crypt vents; wherein fitting each of the third electrostatic charged screens to a crypt drain further comprises fitting each of the third electrostatic charged screens into an end of a third screen housing comprising a third frustoconical shaped side wall, and inserting the third screen housing into the crypt drain.

In some embodiments, the method further includes applying the insecticide to a plurality of fourth electrostatic charged screens; fitting the plurality of fourth electrostatic charged screens to an opening in each of a plurality of floor drains of the mausoleum building; wherein fitting each of the fourth electrostatic charged screens to a floor drain further comprises fitting each of the fourth electrostatic charged screens into an end of a fourth screen housing comprising a fourth frustoconical shaped side wall and a fluid receiving portion, and inserting the fourth screen housing into the floor drain.

In some embodiments, the method further includes replacing the second electrostatic charged screen with a fifth electrostatic charged screen after about six to eight months, wherein the lifespan of the insecticide is about six to eight months.

Embodiments provide a method for minimizing phorid fly activity inside a mausoleum building. The method can include applying an insecticide to a first electrostatic charged screen. The method can also include shaping the first electrostatic charged screen to a first exterior window of the mausoleum building. The method can also include installing the first electrostatic charged screen to the inside of the first exterior window of the mausoleum building.

In some embodiments, the insecticide is in a powdered form. The insecticide can adhere to the first electrostatic charged screen.

In some embodiments, applying the insecticide to the first electrostatic charged screen includes preparing a container filled with the insecticide; and inserting the first electrostatic charged screen into the container.

In some embodiments, the first electrostatic charged screen is pre-charged, and includes at least one of a polyester fiber and a polyethylene terephthalate resin.

In some embodiments, the method also includes attaching a first frame to an outer perimeter of the first electrostatic charged screen. In some embodiments, the method also includes attaching a fastener to the first frame. Installing the first electrostatic charged screen to the first exterior window of the mausoleum building can include attaching the fastener to the first exterior window. In some embodiments, the fastener includes a suction cup.

In some embodiments, the method also includes applying the insecticide to a second electrostatic charged screen. The method can include shaping the second electrostatic charged screen to a second exterior window of the mausoleum building. The method can include installing the second electrostatic charged screen to the inside of the second exterior window of the mausoleum building. In some embodiments, the method also includes attaching a second frame to an outer perimeter of the second electrostatic charged screen. The first exterior window and the second exterior window can be no more than between about 10 feet and about 20 feet apart. In some embodiments, the method also includes applying the insecticide to a plurality of electrostatic charged screens, the first electrostatic charged screen being one of the plurality of electrostatic charged screens. The method can also include installing each of the plurality of electrostatic charged screens in an interior of the mausoleum building such that each of the plurality of electrostatic charged screens is no more than between about 10 feet to about 20 feet apart.

Embodiments provide a method for creating a network of insecticide-treated electrostatic screens. The method can include applying an insecticide to a first electrostatic charged screen. The method can also include placing a first ultraviolet (UV) light in a first container unit. The method can also include placing the first electrostatic charged screen in first container unit. The method can also include placing the first container unit in a mausoleum building. The method can also include installing the first container unit in an interior area of the mausoleum building.

In some embodiments, the method can also include applying an insecticide to a second electrostatic charged screen.

The method can also include placing the second electrostatic charged screen and a second UV light in a second container unit. The method can also include installing the second container unit in a second interior area of the mausoleum building.

In some embodiments, the first UV light is placed behind the first electrostatic charged screen in the first container unit such that the first UV light is intermediate to the first electrostatic charged screen and a back wall of the first container unit, and the first container unit includes an opening at a front end of the first container unit.

In some embodiments, the insecticide is an Environmental Protection Agency (EPA) minimum-risk botanical insecticide.

In some embodiments, the interior area includes a corridor of the mausoleum building, a chapel area of the mausoleum building, an area in a crypt chamber of the mausoleum building, a window of the mausoleum building.

BRIEF DESCRIPTION OF THE DRAWINGS

The disclosed embodiments will hereinafter be described in conjunction with the appended drawings, provided to illustrate and not to limit the disclosed embodiments, wherein like designations denote like elements.

DETAILED DESCRIPTION

Figure 1:
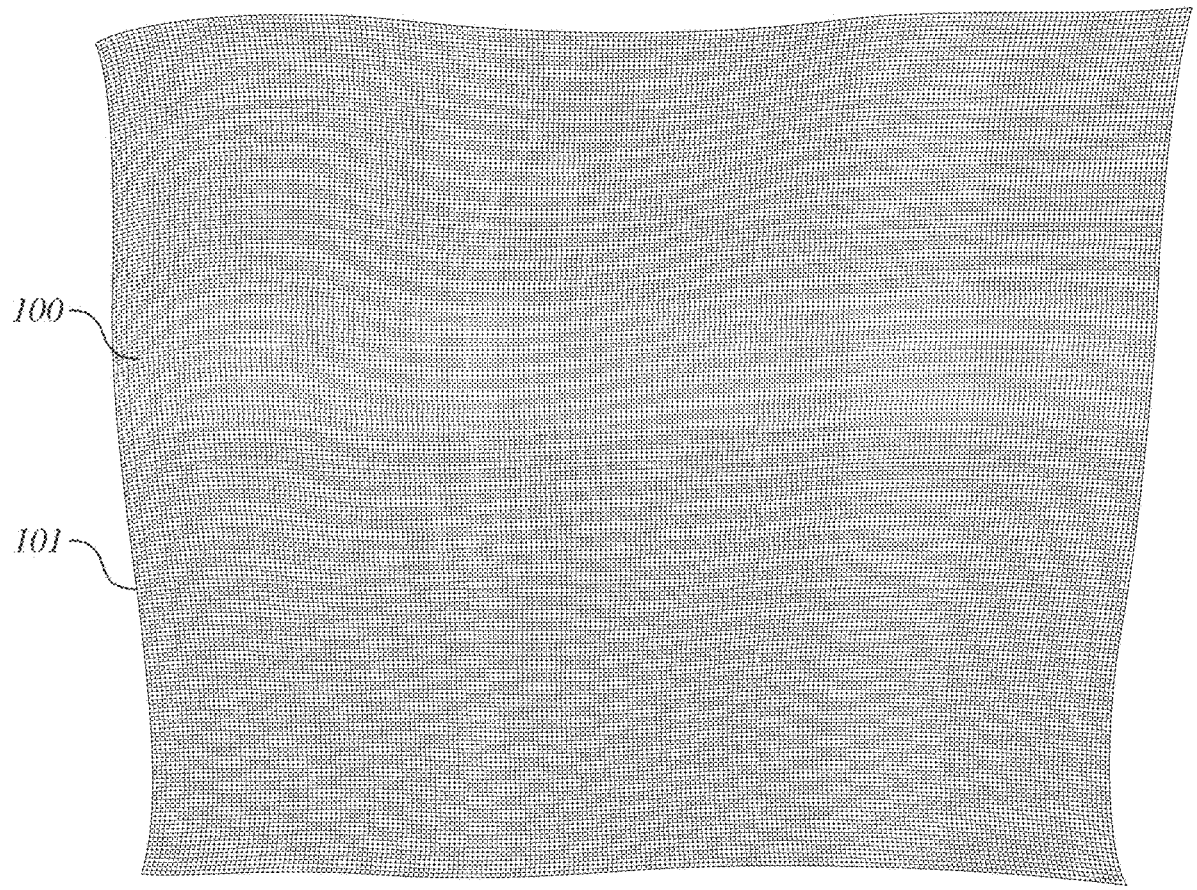
FIG. 1 illustrates an electrostatic charged screen according to an exemplary embodiment.

Various embodiments of the novel systems, apparatuses, and methods disclosed herein are described more fully hereinafter with reference to the accompanying drawings. This disclosure can, however, be embodied in many different forms and should not be construed as limited to any specific structure or function presented throughout this disclosure. Rather, these embodiments are provided so that this disclosure will be thorough and will fully convey the scope of the disclosure to those skilled in the art. Based on the teachings herein, one skilled in the art would appreciate that the scope of the disclosure can be intended to cover any embodiment of the novel systems, apparatuses, and methods disclosed herein, whether implemented independently of, or combined with, any other embodiment of the disclosure. For example, an apparatus can be implemented or a method can be practiced using any number or combination of the embodiments set forth herein. In addition, the scope of the disclosure can be intended to cover such an apparatus or method that can be practiced using other structure, functionality, or structure and functionality in addition to or other than the various embodiments of the disclosure set forth herein. It should be understood that any embodiment disclosed herein can be implemented by one or more elements of a claim.

Although particular embodiments are described herein, many variations and permutations of these embodiments fall within the scope of the disclosure. Although some benefits and advantages of certain embodiments are mentioned, the scope of the disclosure is not intended to be limited to particular benefits, uses, and/or objectives. The detailed description and drawings are merely illustrative of the disclosure rather than limiting, the scope of the disclosure being defined by the appended claims and equivalents thereof.

The systems and methods described herein minimize phorid fly infestation in cemetery mausoleum buildings. The systems and methods disrupt the natural cycle of phorid fly mating and reproduction in mausoleums. In embodiments, an insecticide to eliminate phorid flies can be applied to an electrostatic charged screen. In some embodiments, the screens can be installed on the windows in the mausoleum. After mating, phorid flies can lay eggs in occupied crypts. The flies can enter through one or more openings in the crypts. In some embodiments, additional electrostatic screens with insecticide applied can be installed in these openings. Accordingly, the mating and reproduction steps can be interrupted to prevent phorid fly infestation. In some embodiments, floor drain openings, sink openings, and other openings in the interior of the mausoleum can also receive electrostatic screens with insecticide. In further embodiments, roof vent openings intermediate to the interior of the mausoleum and the exterior ambient environment can additionally receive electrostatic screens with insecticide, where the roof vents openings are fluidly coupled to the crypt openings. In still further embodiments, container units having electrostatic screens with insecticide and an ultraviolet (UV) light can also be placed throughout the interior of the mausoleum, such as where significant phorid fly activity can occur.

Figure 3:
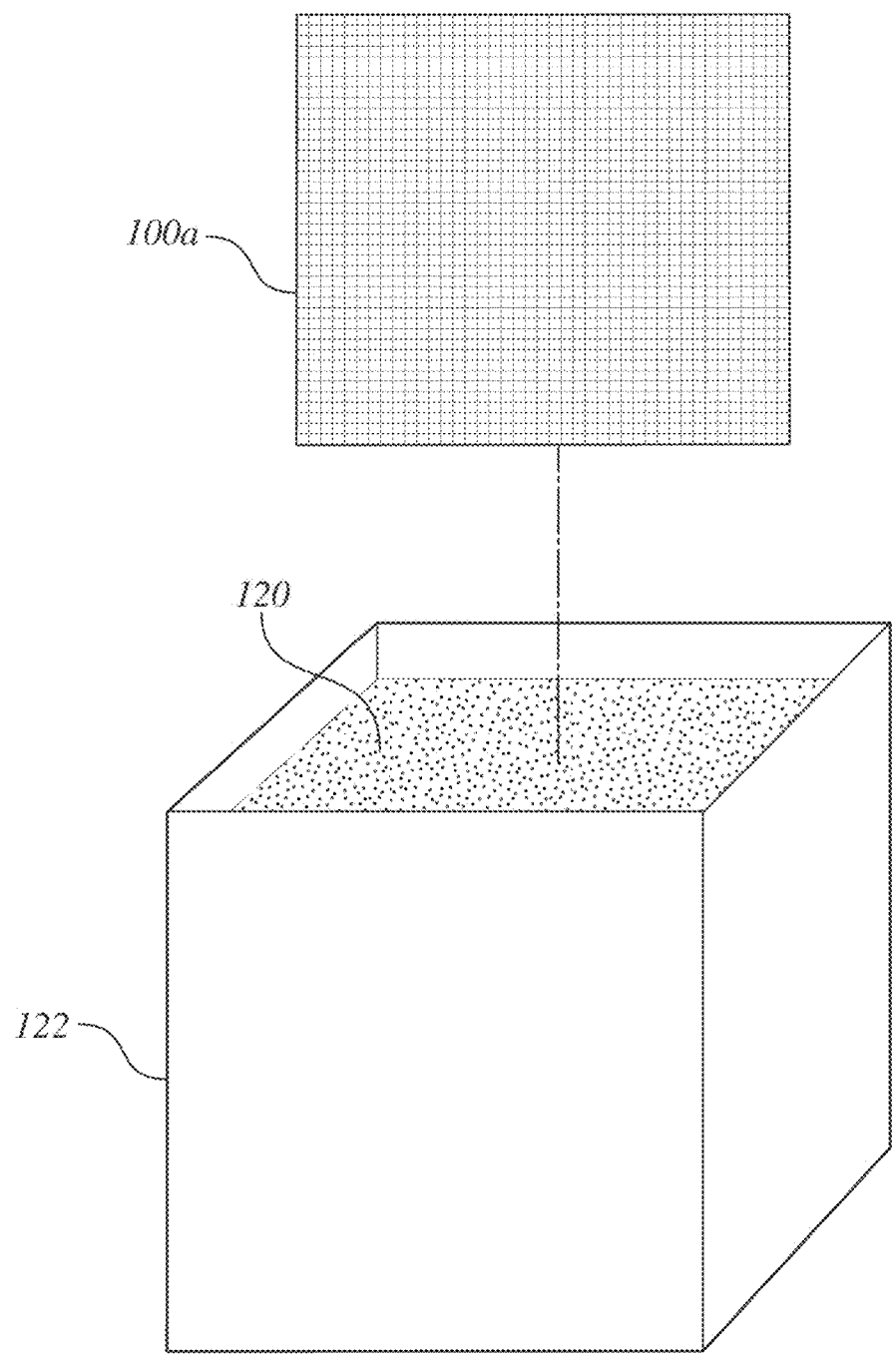
FIG. 3 illustrates the electrostatic charged screen of FIG. 1 and a container according to an exemplary embodiment.
Figure 4:
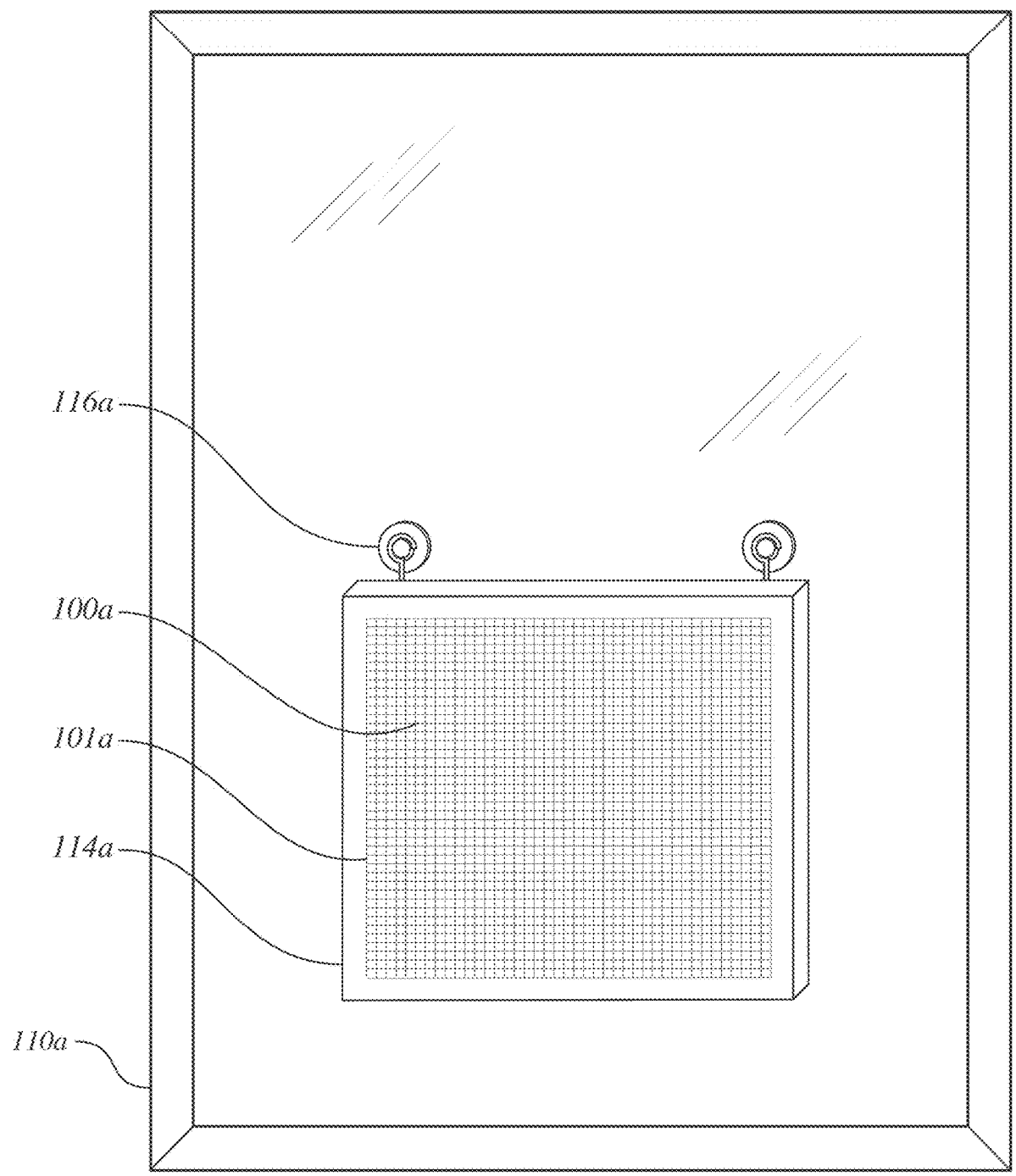
FIG. 4 illustrates the electrostatic charged screen of FIG. 1 installed to a window according to an exemplary embodiment.
Figure 5:
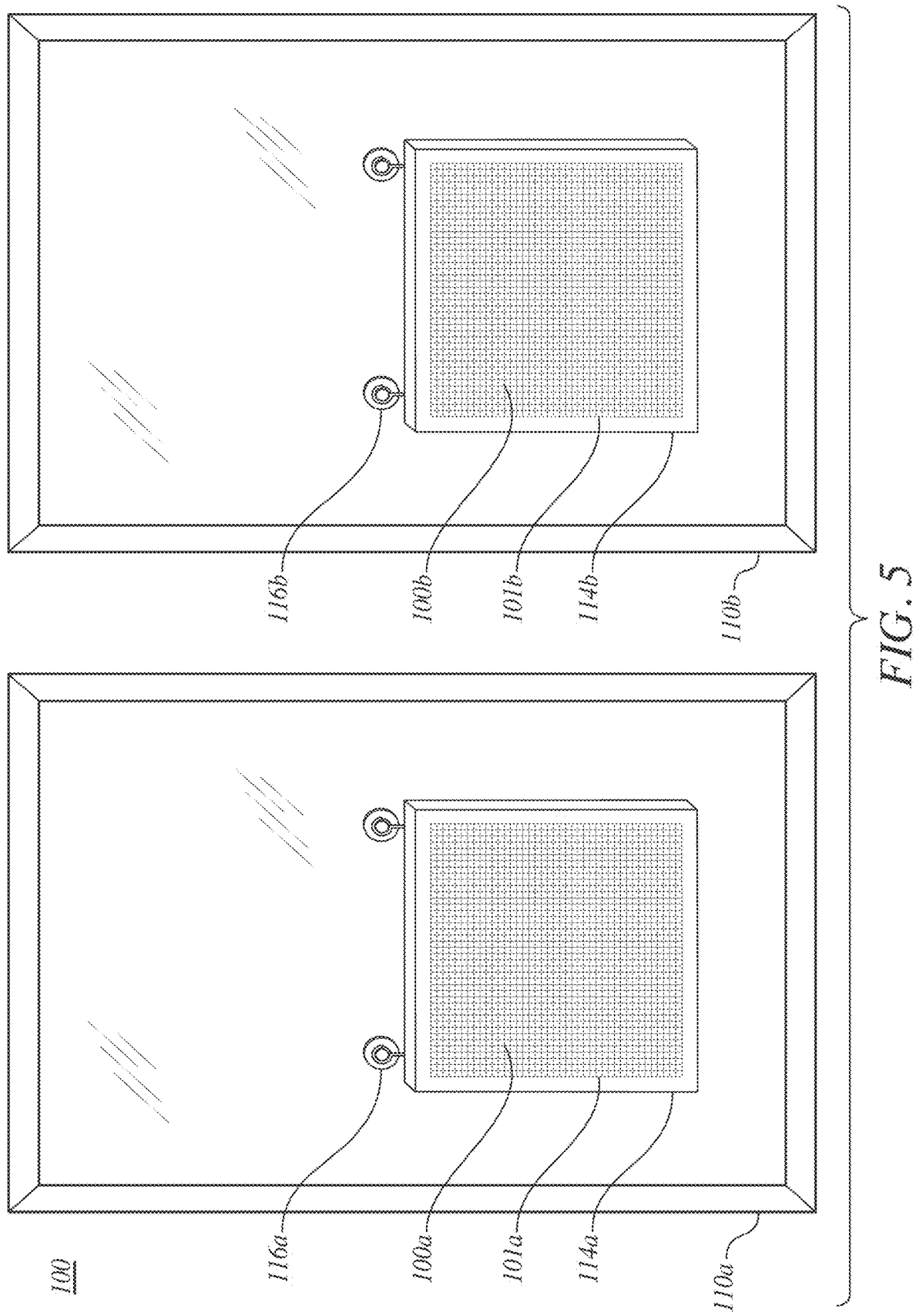
FIG. 5 illustrates the electrostatic charged screen of FIG. 1 and a second electrostatic charged screen according to an exemplary embodiment.

Embodiments of the systems and methods will now be described with reference to the figures. Referring to FIGS. 1-5, an embodiment including a method for minimizing phorid fly activity inside a mausoleum building 10 (FIGS. 11-12) can include applying an insecticide 120 (FIG. 2) to an electrostatic charged screen 100 having an outer perimeter 101, as shown in FIG. 1, according to an exemplary embodiment. Electrostatic charged screen 100 may be a first window electrostatic charged screen 100a as shown in FIG. 4, in certain embodiments, first window electrostatic charged screen 100a can be pre-charged. In other embodiments, first window electrostatic charged screen 100a can include a polyester fiber. Additionally or alternatively, first window electrostatic charged screen 100a can include a polyethylene terephthalate resin.

In certain embodiments, first window electrostatic charged screen 100a can be rectangular or square-shaped. In some embodiments, first window electrostatic charged screen 100a can be about five inches by five inches or six inches by six inches.

Embodiments of the method can also include shaping first window electrostatic charged screen 100a to a first exterior window 110, 110a of mausoleum building 10 (FIGS. 4, 5, 11-12). Shaping first window electrostatic charged screen 100a can include laser cutting first window electrostatic charged screen 100a, or cutting first window electrostatic charged screen 100a with some other method. First window electrostatic charged screen 100a can be the same size as first exterior window 110a. Alternatively, first window electrostatic charged screen 100a can be larger or smaller than first exterior window 110a. In this way, first window electrostatic charged screen 100a can span at least a portion of first exterior window 110a.

Figure 11:
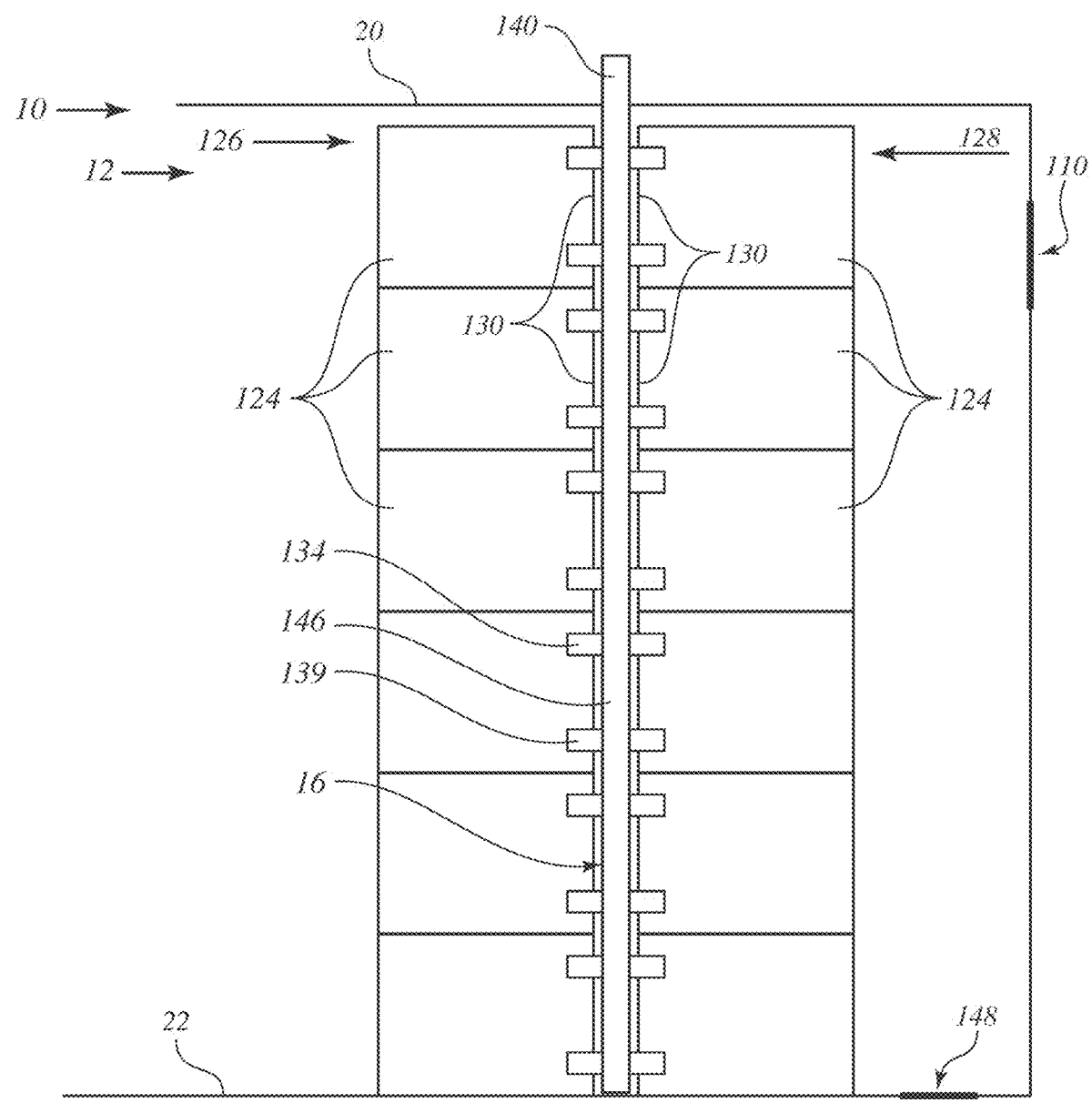
FIG. 11 illustrates a schematic of airflow from crypt vents to roof vents in a poured-in-place mausoleum according to an exemplary embodiment.
Figure 12:
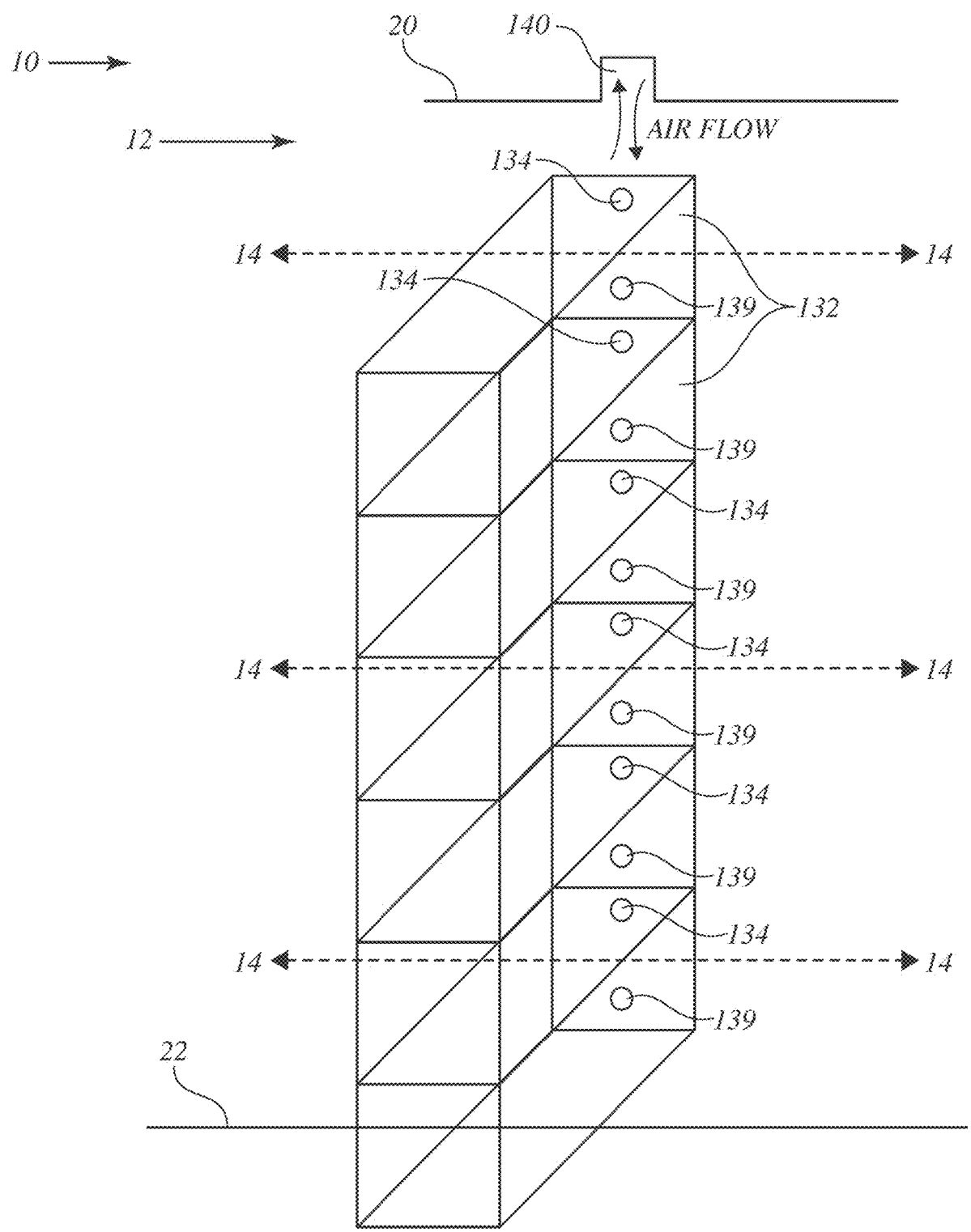
FIG. 12 illustrates a schematic of airflow from crypt vents to roof vents in a precast building mausoleum according to an exemplary embodiment.

In some embodiments, the method can also include installing first window electrostatic charged screen 100a to the inside (interior) of first interior window 110a of the mausoleum building 10 (FIGS. 11-12). The inside of first exterior window 110a can be a location within an interior 12 (FIGS. 11-12) of mausoleum building 10 with significant phorid fly activity, interior 12 being between a roof 20 (FIGS. 11-12) of mausoleum building 10 and ground 22 (FIGS. 11-12), or a bottom floor of mausoleum building 10. In other words, because natural light can enter mausoleum building 10 through first exterior window 110a, phorid flies can congregate at first exterior window 110a as they are attracted to light. Significant phorid fly activity can occur when between about five and about 20 phorid flies, such as between about 10 and about 15 phorid flies congregate at first exterior window 110a. Because first exterior window 110a can experience significant phorid fly activity, first exterior window 110a can be an area to place first window electrostatic charged screen 100a having insecticide 120 (FIG. 2) to eliminate phorid flies.

Figure 2:
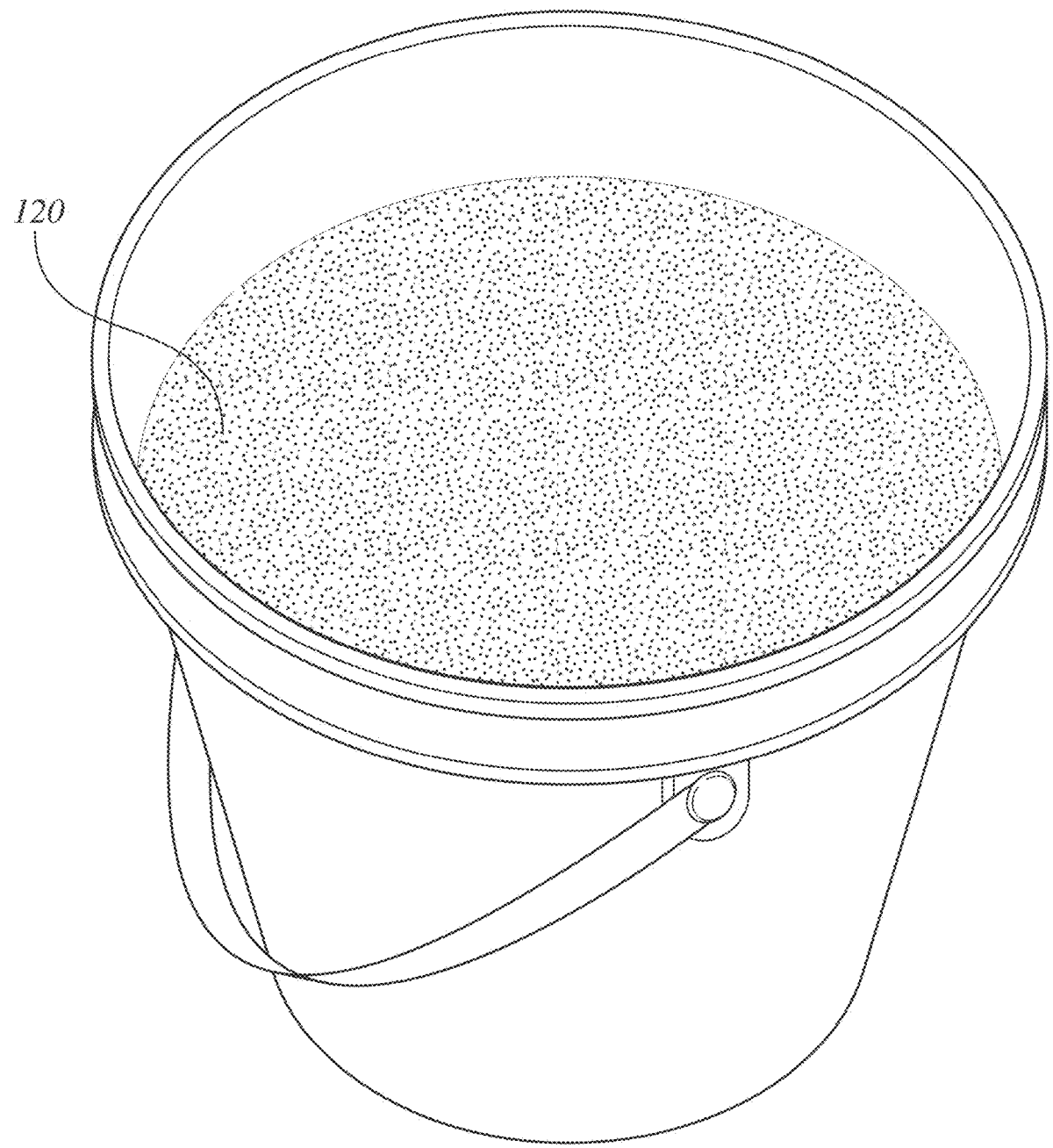
FIG. 2 illustrates a powdered insecticide according to an exemplary embodiment.

Referring the FIG. 2, insecticide 120 may include a powdered insecticide or crystalline insecticide dust, according to an exemplary embodiment. For example, insecticide 120 may include EcoVia™ WD Wettable Dust, which can include thyme oil, 2-phenethyl propionate, silica, wintergreen oil, polyglyceryl oleate, and isoproyl mysristate as active ingredients.

In other embodiments, insecticide 120 can include an Environmental Protection Agency (EPA) minimum-risk botanical insecticide. In some embodiments, the effectiveness of powered insecticide 120 can be about six to eight months.

In some embodiments, insecticide 120 can adhere to first window electrostatic charged screen 100a. With reference to FIGS. 2-3, applying insecticide 120 to first window electrostatic charged screen 100a can include preparing a container 122 filled with insecticide 120 and inserting first window electrostatic charged screen 100a into container 122, according to an exemplary embodiment. Insecticide 120 can then adhere to first window electrostatic charged screen 100a such that first window electrostatic charged screen 100a can be placed in areas with significant phorid fly activity to eliminate phorid flies.

In certain embodiments, to facilitate the application of insecticide 120 to first window electrostatic charged screen 100a, container 122 can be larger in size than first window electrostatic charged screen 100a. For example, first window electrostatic charged screen 100a can be about five inches by five inches, and container 122 can be about eight inches by eleven inches. Accordingly, first window electrostatic charged screen 100a can be completely submerged in container 122. In some embodiments, insecticide 120 can be in powdered form such that the electrostatic charge on first window electrostatic charged screen 100a causes the powdered insecticide granules of insecticide 120 to adhere to first window electrostatic charged screen 100a. In one embodiment, container 122 can include about eight cups of powdered insecticide 120, for example, to form a two inch height of insecticide 120 in container 122. In other embodiments, powdered insecticide can be applied to screen 100a by other known methods, for example, but not limited to, distributing dust on the screen, and spraying dust on the screen. Insecticide can also be applied by a method that involves placing the screens inside a rotating cylindrical drum filled with powdered insecticide.

First window electrostatic charged screen 100a installed to the inside of first interior window 110a of the mausoleum building 10 (FIGS. 11-12) is shown in FIG. 4, according to an exemplary embodiment. As shown, a frame 114a can be attached to an outer perimeter 101a of first window electrostatic charged screen 100a. Frame 114a can include wood or plastic, for example. In addition, one or more fasteners 116a can be attached to frame 114a. Accordingly, installing first window electrostatic charged screen 100a to first exterior window 110a of mausoleum building 10 can include attaching one or more fasteners 116a to first exterior window 110a. In one embodiment, fastener 116 can be a suction cup, as shown in FIG. 4. As shown in this particular embodiment, two fasteners 116, e.g., two suction cups, can facilitate installing first window electrostatic charged screen 100a to first exterior window 110a. In this embodiment, screen 100a is smaller than the window 110a.

In certain embodiments, mausoleum building 10 (FIGS. 11-12) can include a plurality of exterior windows 110, including first exterior window 110a. Each exterior window 110 can be a location at which significant phorid fly activity occurs. In on embodiment, each of the plurality of exterior windows 110 can receive an electrostatic charged screen 100 treated with insecticide 120 (FIG. 2), similar to first window electrostatic charged screen 100a. In other words, insecticide 120 can be applied to a plurality of electrostatic charged screens 100, shown in FIG. 5, according to an exemplary embodiment, first window electrostatic charged screen 100a being one of the plurality of electrostatic charged screens 100.

In some embodiments, each of the plurality of electrostatic charged screens 100 can be installed in interior 12 (FIGS. 11-12) of mausoleum building 10 (FIGS. 11-12) such that each of the plurality of electrostatic charged screens 100 are between about 10 feet to about 20 feet apart. For example, each of the plurality of electrostatic charged screens 100 can be between about 12 feet and about 18 feet apart, such as between about 14 feet and about 16 feet apart. These distances can apply for both lateral and vertical spacing, where applicable to the size of the room.

In some embodiments, second window electrostatic charged screen 100b, can be one of the plurality of electrostatic charged screens 100. In another example, to minimize phorid fly activity inside mausoleum building 10, second window electrostatic charged screen 100b can be installed to a second exterior window 110b of mausoleum building 10. Similar to first window electrostatic charged screen 100a, insecticide 120 can be applied to second window electrostatic charged screen 100b. Second window electrostatic charged screen 100b can be shaped to second exterior window 110b. Second window electrostatic charged screen 100b can then be installed to the inside of second exterior window 110b. As with frame 114 of first window electrostatic charged screen 100a, a frame 114b can be attached to second window electrostatic charged screen 100b to an outer perimeter 101b of second window electrostatic charged screen 100b.

Figure 6:
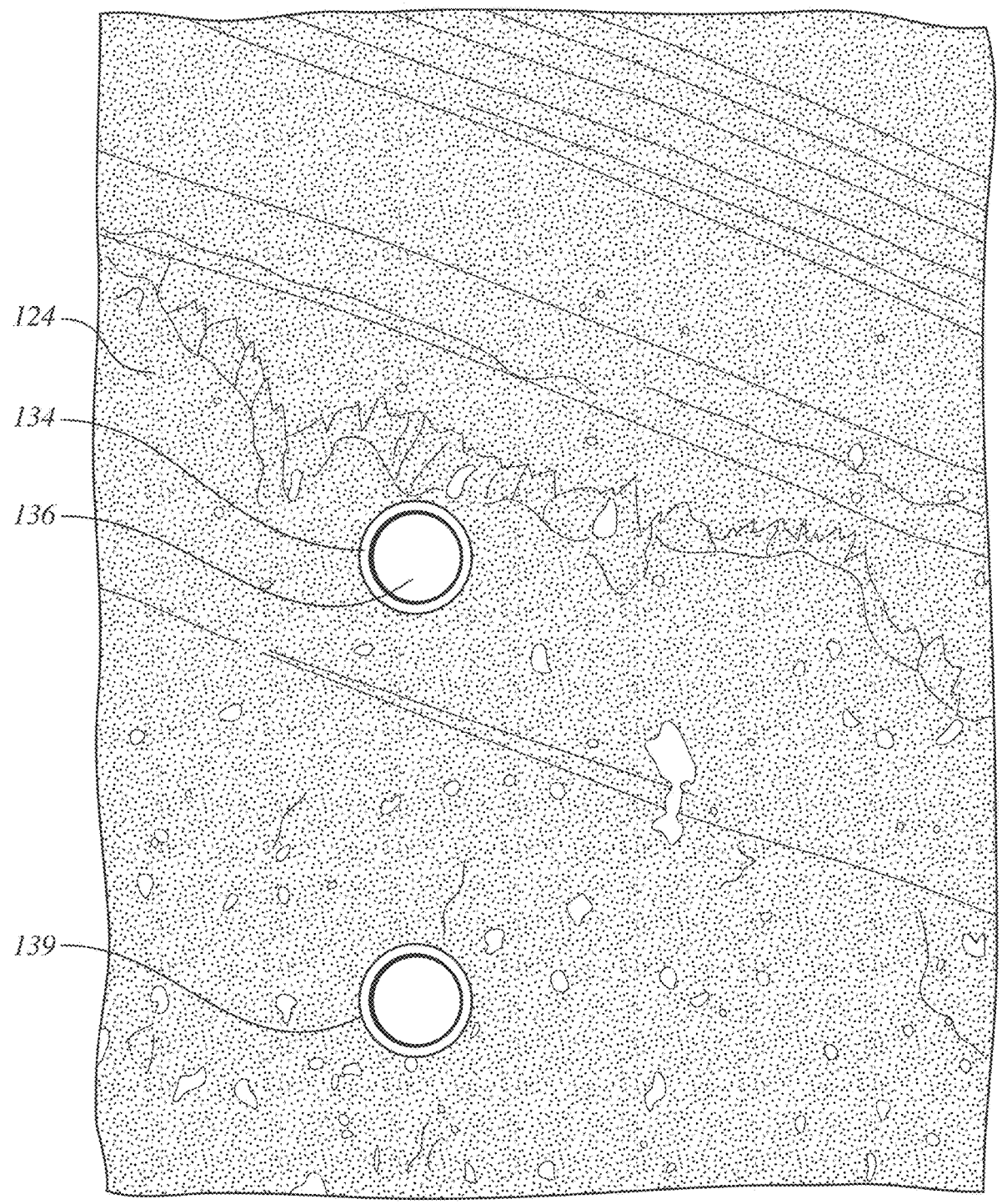
FIG. 6 illustrates a crypt vent opening according to an exemplary embodiment.

An illustration including the inside of crypts 124, is shown in FIG. 6, according to an exemplary embodiment. As shown crypts 124 can include crypt vents 134 having crypt vent openings 136 on a side of each crypt 124.

In embodiments referring to FIGS. 6-8B, openings, such as crypt vent openings 136, can include insecticide 120 (FIG. 2) to eliminate phorid flies. A crypt electrostatic charged screen 102 is shown in FIG. 7A, according to an exemplary embodiment. Crypt electrostatic charged screen 102 can be similar to window electrostatic charged screens 100 (FIG. 1). Crypt electrostatic charged screen 102 can be rectangular. For example, crypt electrostatic charged screen 102 can be square-shaped.

Figure 7A:
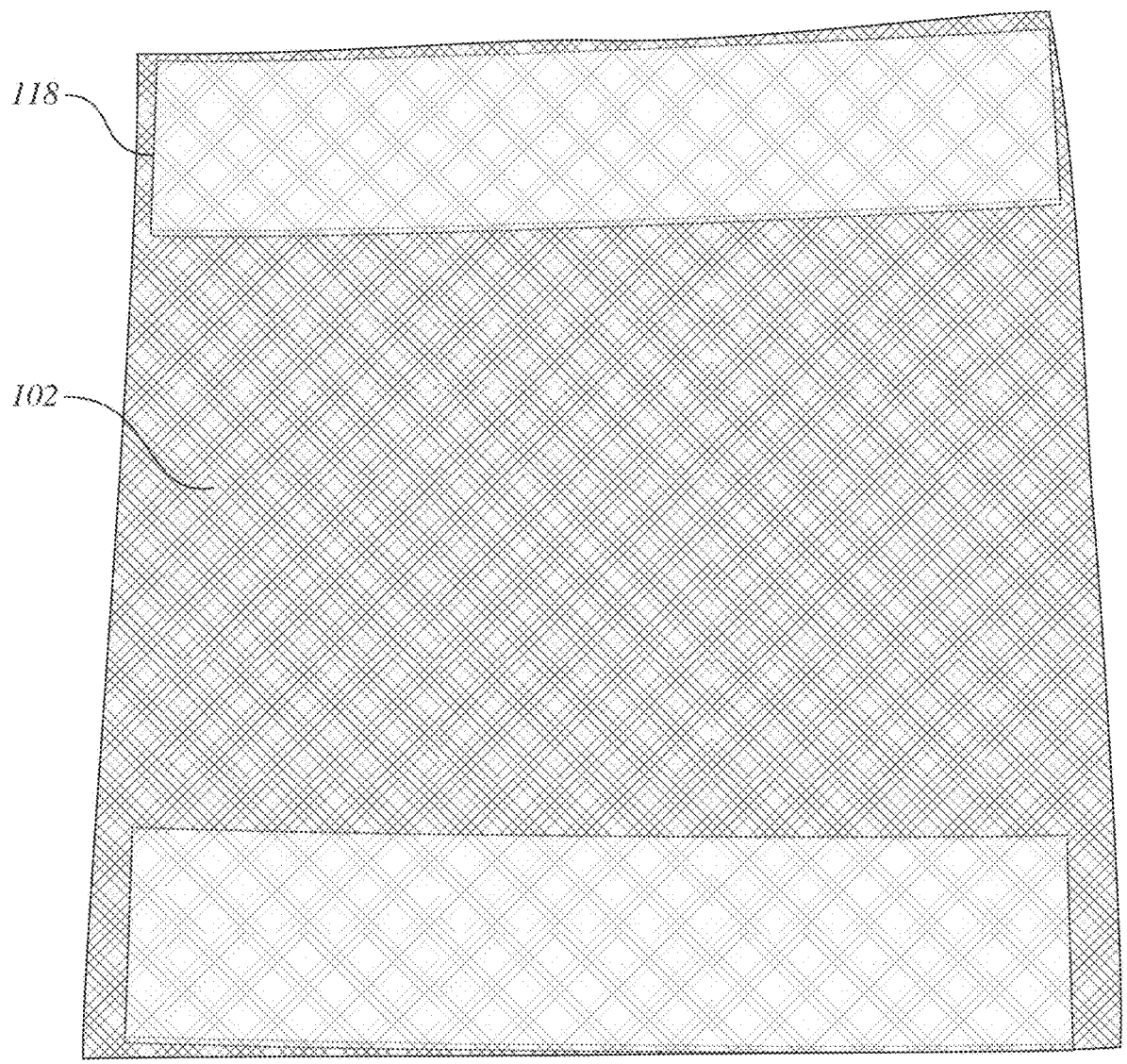
FIG. 7A illustrates an electrostatic charged screen according to an exemplary embodiment.
Figure 7B:
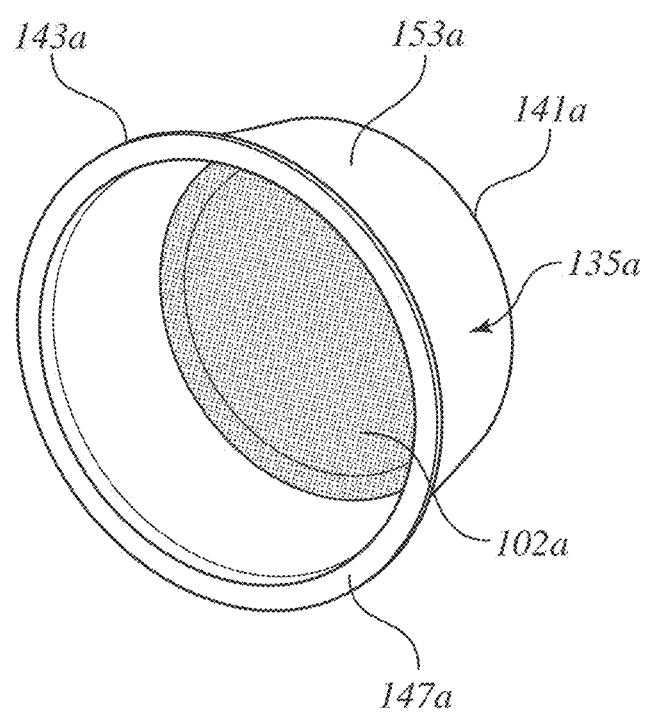
FIG. 7B illustrates a crypt vent electrostatic charged screen according to an exemplary embodiment.

According to another exemplary embodiment, a crypt electrostatic charged screen 102a may be circular and fitted in a screen housing 135a, as shown in FIG. 7B. Screen housing 135a may have a cup shape with a frustoconical shaped side wall 153a. Screen housing 135a may include a smaller-diameter closed base end 141a for receiving a crypt electrostatic charged screen 102a opposing a larger-diameter open upper end 143a having an annular flange 147a.

An embodiment of the method for minimizing phorid fly activity can include applying insecticide 120 (FIG. 2) to a plurality of crypt electrostatic charged screens 102, 102a similar to applying insecticide 120 to window electrostatic charged screens 100, discussed above. The method can also include fitting each of the crypt electrostatic charged screens 102, 102a to crypt vent 134, shown in FIG. 8, according to an exemplary embodiment, where crypt vents 134 coupled to pipes 146 can fluidly couple interiors of the plurality of crypts 124 (FIG. 6) and interior 12 (FIGS. 11-12) of mausoleum 10 (FIGS. 11-12). In this way, crypt electrostatic charged screens 102 applied to crypt vents 134 can interrupt phorid fly activity between crypts 124 (FIG. 6) and interior 12 of mausoleum 10. Crypt electrostatic charged screens 102, 102a can be framed to facilitate fitting each of the crypt electrostatic charged screens 102, 102a to crypt vent 134.

In embodiments, fitting each of the crypt electrostatic charged screens 102 to crypt vents 134, shown in FIGS. 7A-8B, can include attaching a fastener 118 to each of the crypt electrostatic charged screens 102 and attaching the fastener 118 to each of the plurality of crypt vents 134. Fastener 118 can include an adhesive.

Figure 8A:
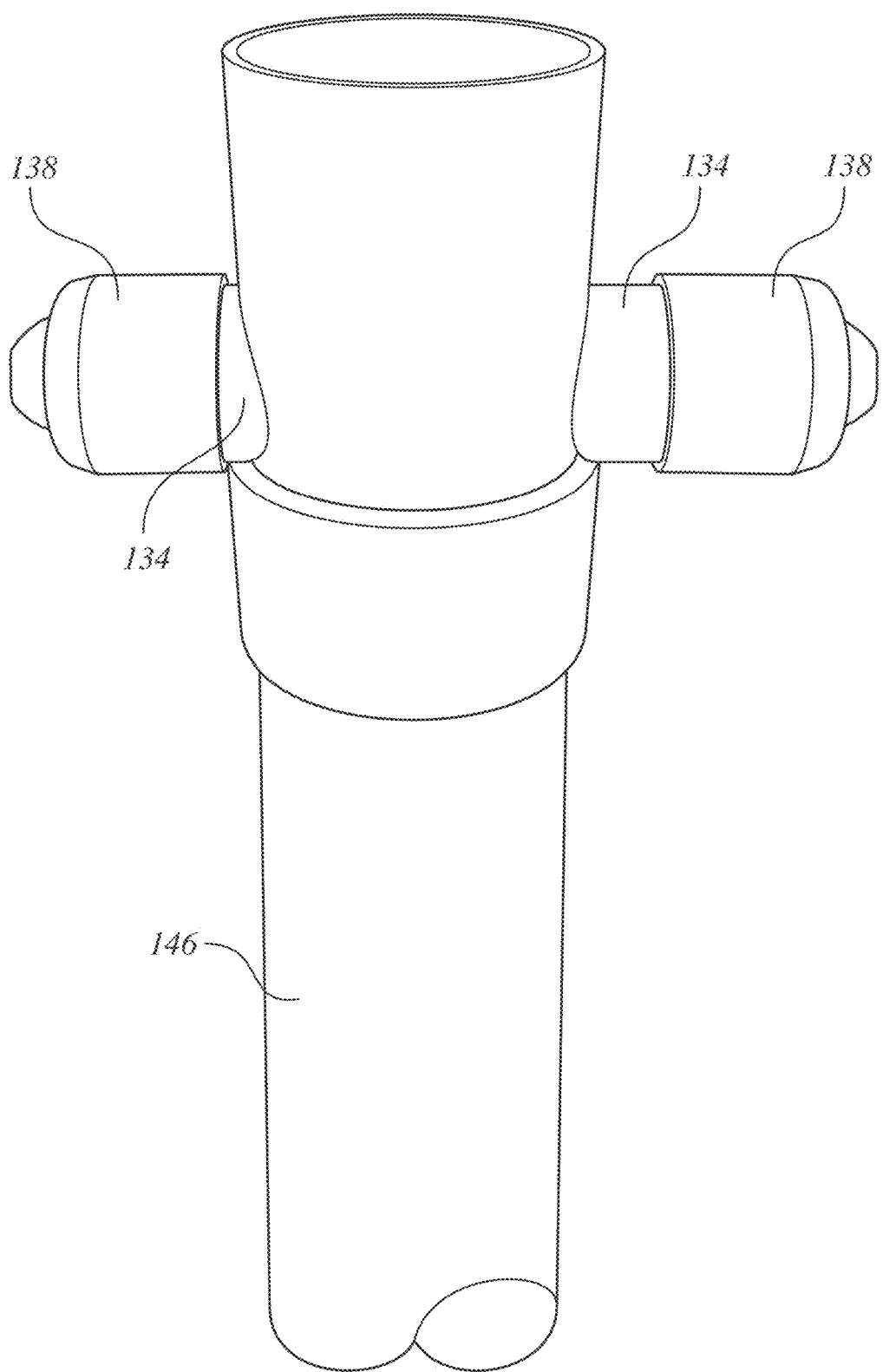
FIG. 8A illustrates a crypt vent according to an exemplary embodiment.
Figure 8B:
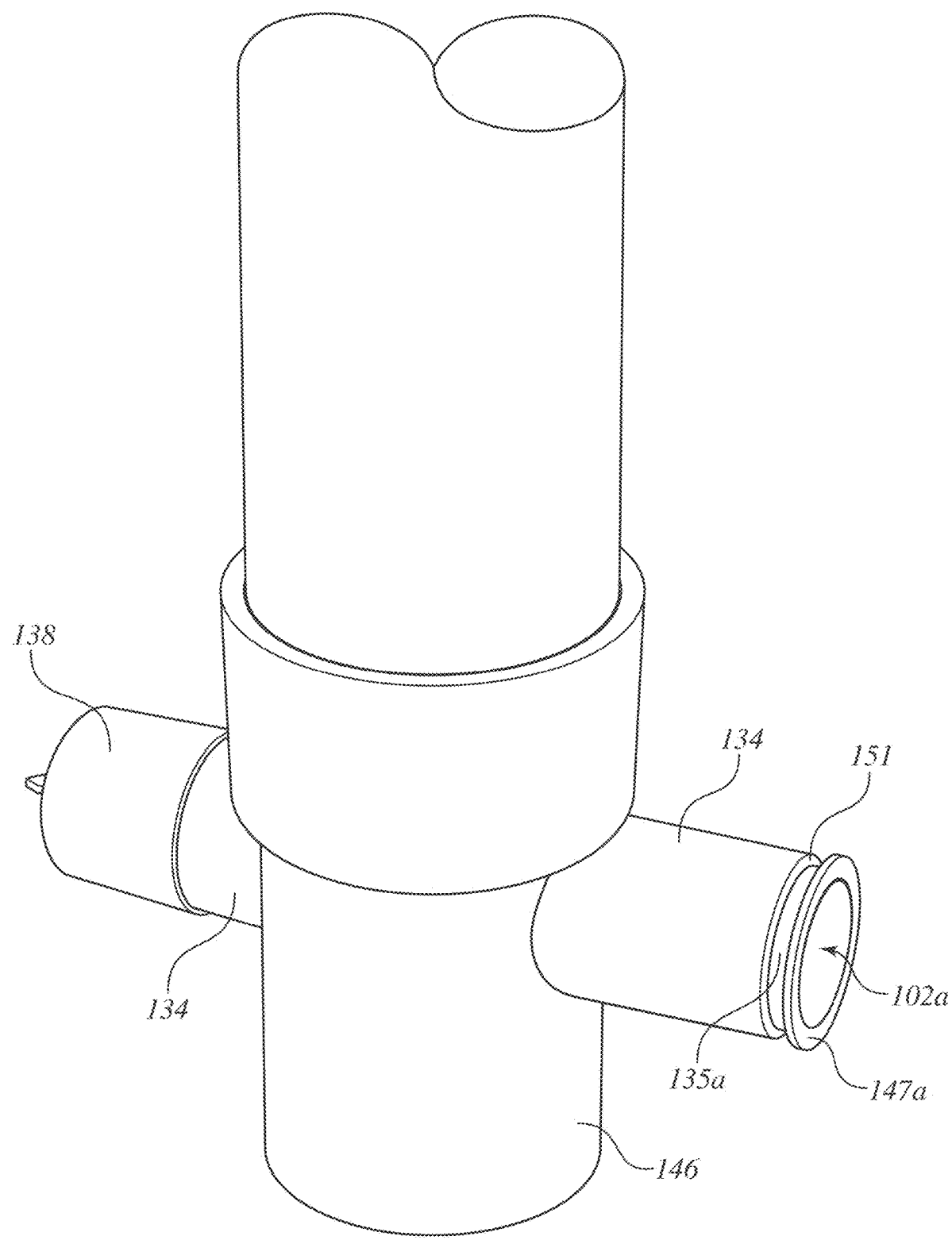
FIG. 8B illustrates a crypt vent according to an exemplary embodiment.

In certain embodiments, crypt vents 134 can be installed in crypts 124 (FIG. 6) with crypt vent caps 138 covering crypt vents 134, shown in FIG. 8A. Crypts 124 can be formed of concrete. Accordingly, crypt vent caps 138 can prevent poured concrete from entering crypt vents 134 while crypts 124 are being formed. After crypts 124 are formed, crypt vent caps 138 can be removed. Crypt electrostatic charged screens 102a can then be installed after crypt vent caps 138 are removed. In certain embodiments, fitting each of the crypt electrostatic charged screens 102a to crypt vents 134 may include inserting screen housing 135a, base end 141a first, within crypt vent 134 such that annular flange 147a is adjacent an end 151 of crypt vent 134, as shown in FIG. 8B.

Crypts 124 (FIG. 6) can include a plurality of crypt vents, including crypt vents 134. For example, crypts 124 can each include crypt vent 134 and a crypt drain 139 on a side of each crypt 124, shown in FIGS. 11-12, according to an exemplary embodiment. Similar to crypt vent 134, crypt drain 139 can fluidly couple interiors of the plurality of crypts 124 (FIG. 6) and interior 12 (FIGS. 11-12) of mausoleum 10 (FIGS. 11-12). In some embodiments, crypt drains 139 can receive crypt electrostatic charged screens 102 similar to crypt vents 134. In addition, in some embodiments, each crypt drain 139 can include a screen housing 135a that receives a crypt electrostatic charged screen 102a (FIG. 7B) utilizing the same method as the crypt vents 134 discussed above. In certain embodiments, crypt electrostatic charged screen 102a may have a diameter of approximately 0.5 inches, and frame 135a may have a depth of approximately 0.25 to 0.5 inches. In certain embodiments, such as in FIG. 7B and FIG. 12, crypt electrostatic charged screen 102a may have a diameter of approximately two inches, and frame 135a may have a depth of approximately one inch.

With reference to FIGS. 11-12, embodiments of crypt electrostatic charged screens 102 can be shaped to fit the shapes of crypt vents 134 in crypts 124. In some embodiments, crypt electrostatic screens 102 are shaped to cover the entirety of crypt vents 134. Additionally, crypt electrostatic charged screens 102 can be shaped to fit the shapes of crypt drains 139 in crypts 124. In some embodiments, crypt electrostatic charged screens 102 can be laser cut to be shaped. In certain embodiments, crypt electrostatic charged screens 102 are shaped to cover the entirety of crypt drains 139.

Figure 9A:
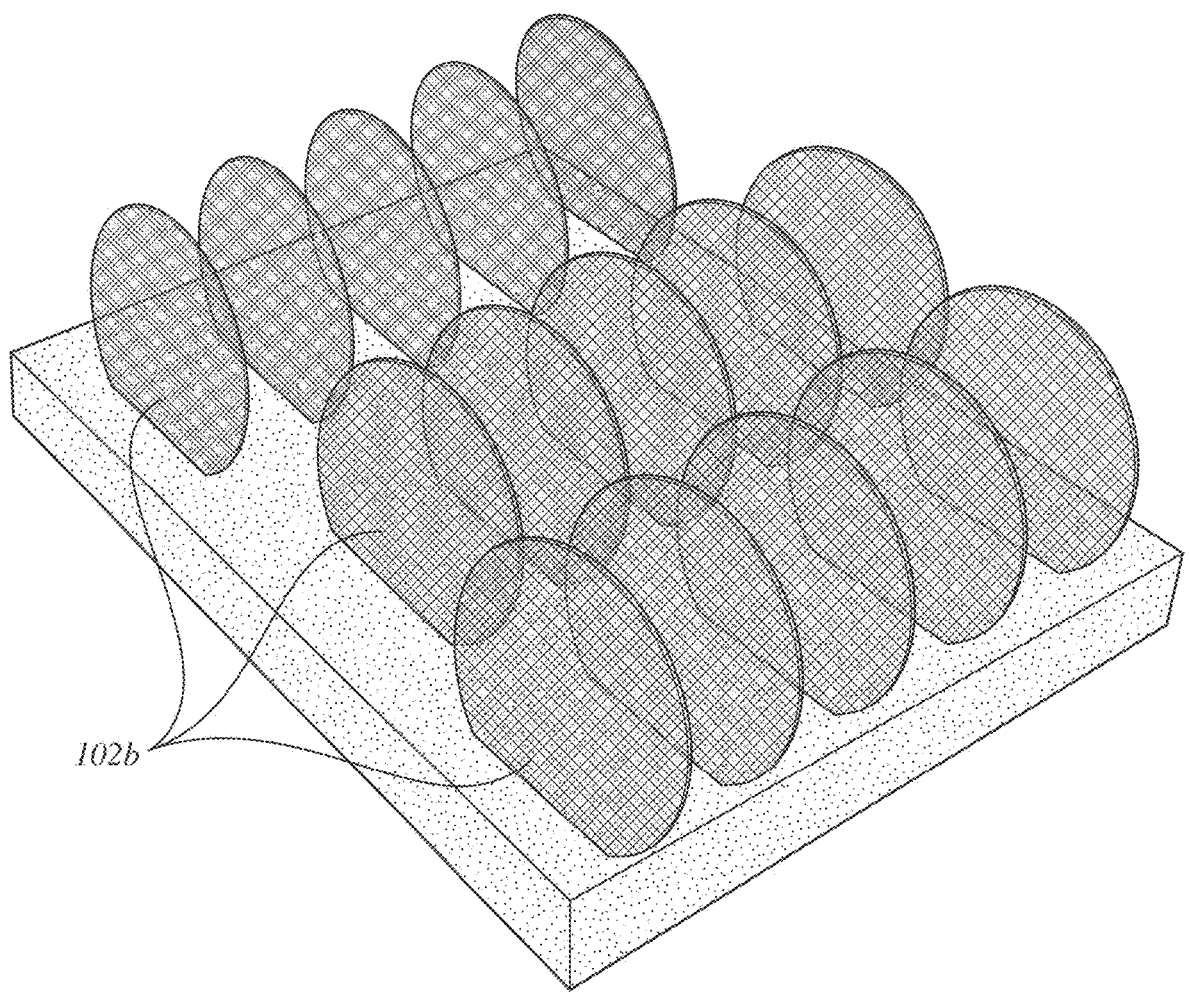
FIG. 9A illustrates electrostatic charged screens according to an exemplary embodiment.
Figure 10A:
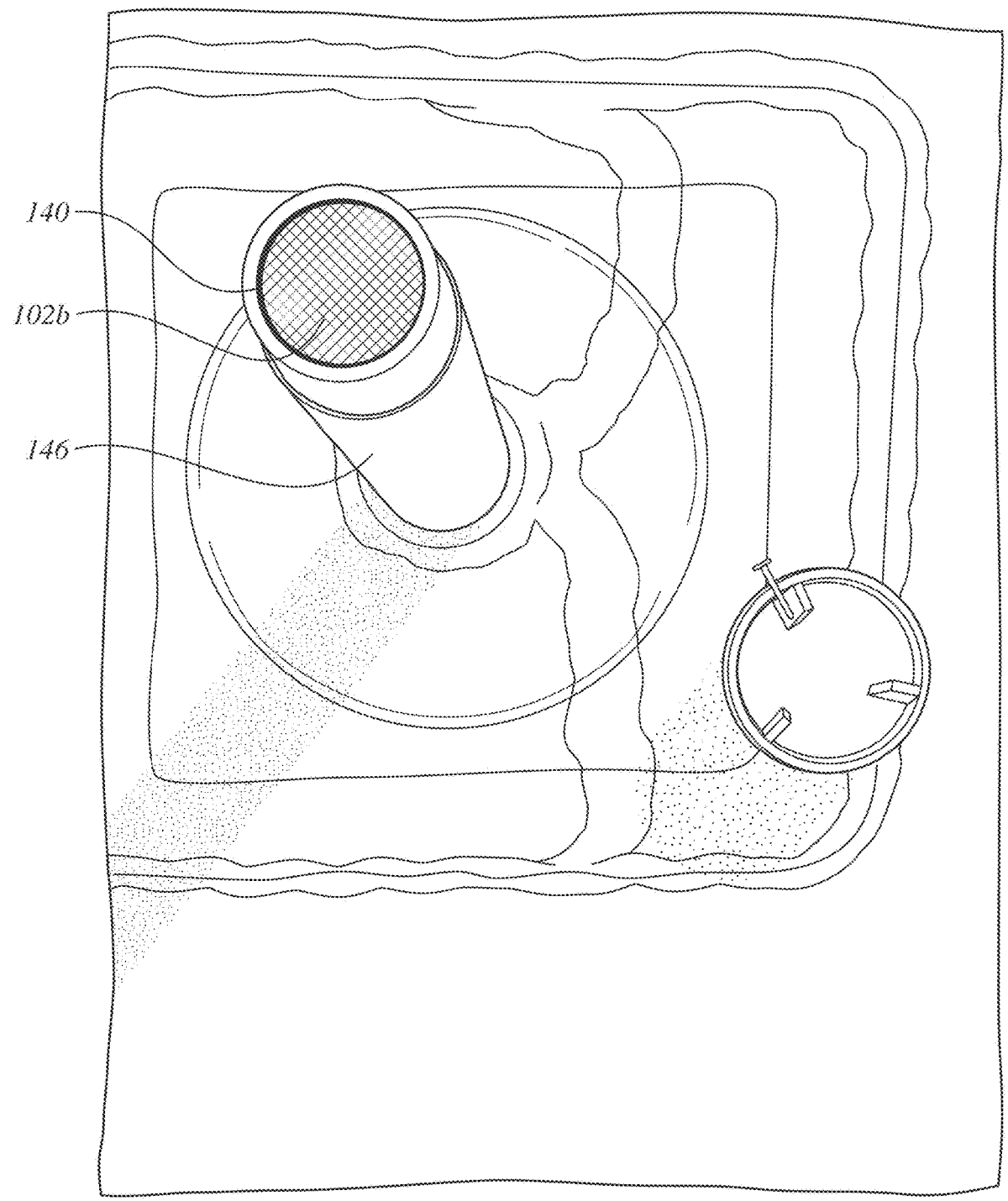
FIG. 10A illustrates a roof vent according to an exemplary embodiment.

In certain embodiments, crypt vents 134 and crypt drains 139 can be fluidly coupled to an evacuation outlet to release air to an ambient exterior of mausoleum 10 (FIGS. 11-12). Roof vent 140, shown in FIGS. 10A-10C, according to an exemplary embodiment, can be an evacuation outlet that is fluidly coupled to crypt vents 134 and crypt drains 139. Mausoleum 10 can include a plurality of roof vents 140 disposed on roof 20 (FIGS. 11-12). Roof electrostatic charged screens 102b, shown in FIG. 9A, according to an exemplary embodiment, having insecticide 120 (FIG. 2) can be applied to roof vents 140, as further described below. Roof electrostatic charged screens 102b can be similar to window electrostatic charged screens 100 (FIG. 1). Roof electrostatic charged screens 102b can be circular having a diameter of between about two inches.

Referring to FIGS. 9A-10C, a method for minimizing phorid fly activity can include applying insecticide 120 (FIG. 2) to a plurality of roof electrostatic charged screens 102b (FIG. 9A), similar to applying insecticide 120 to window electrostatic charged screens 100, discussed above. The method can include fitting each of the plurality of roof electrostatic charged screens 102b to each of a plurality of roof vents 140 of mausoleum 10 (FIGS. 11-12), where roof vents 140 can fluidly couple interior 12 (FIGS. 11-12) of mausoleum 10 and an ambient exterior of mausoleum 10. In this way, roof electrostatic charged screens 102b applied to roof vents 140 can limit entrance of phorid flies into interior 12 of mausoleum 10 from an ambient exterior of mausoleum 10. Fitting each of the plurality of roof electrostatic charged screens 102b to each of a plurality of roof vents 140 can include pressure fitting each of the plurality of roof electrostatic charged screens 102b to opening in each of a plurality of roof vents 140. Roof electrostatic charged screens 102b can be framed to facilitate fitting each of the roof electrostatic charged screens 102b to roof vent 140.

In certain embodiments, roof electrostatic charged screens 102b can be shaped to fit the shapes of roof vents 140. In embodiments, roof electrostatic charged screens 102b can be laser cut to be shaped. In certain embodiments, screen 102b are shaped to cover the entire roof vent 140.

Figure 10B:
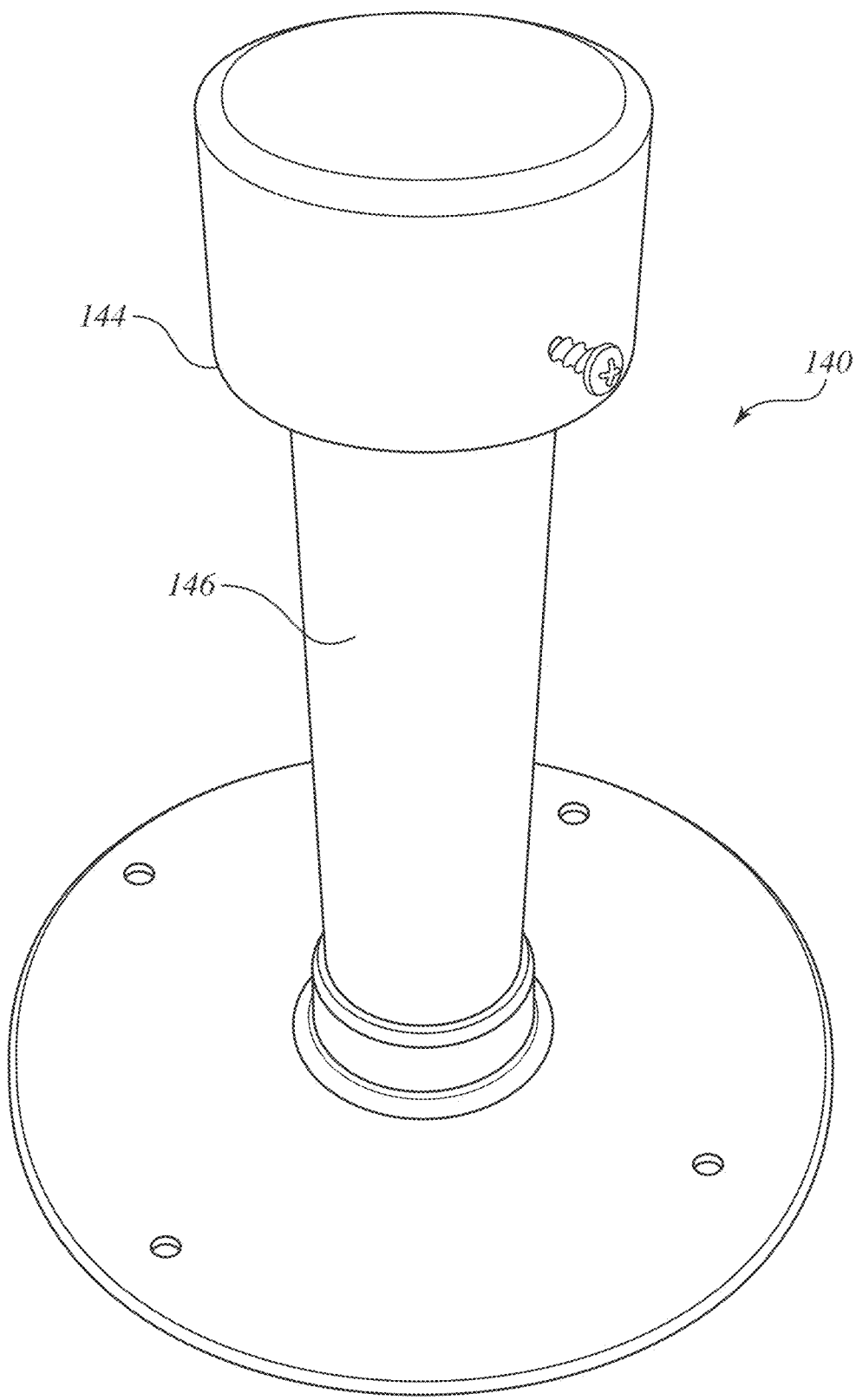
FIG. 10B illustrates a roof vent according to an exemplary embodiment.
Figure 10C:
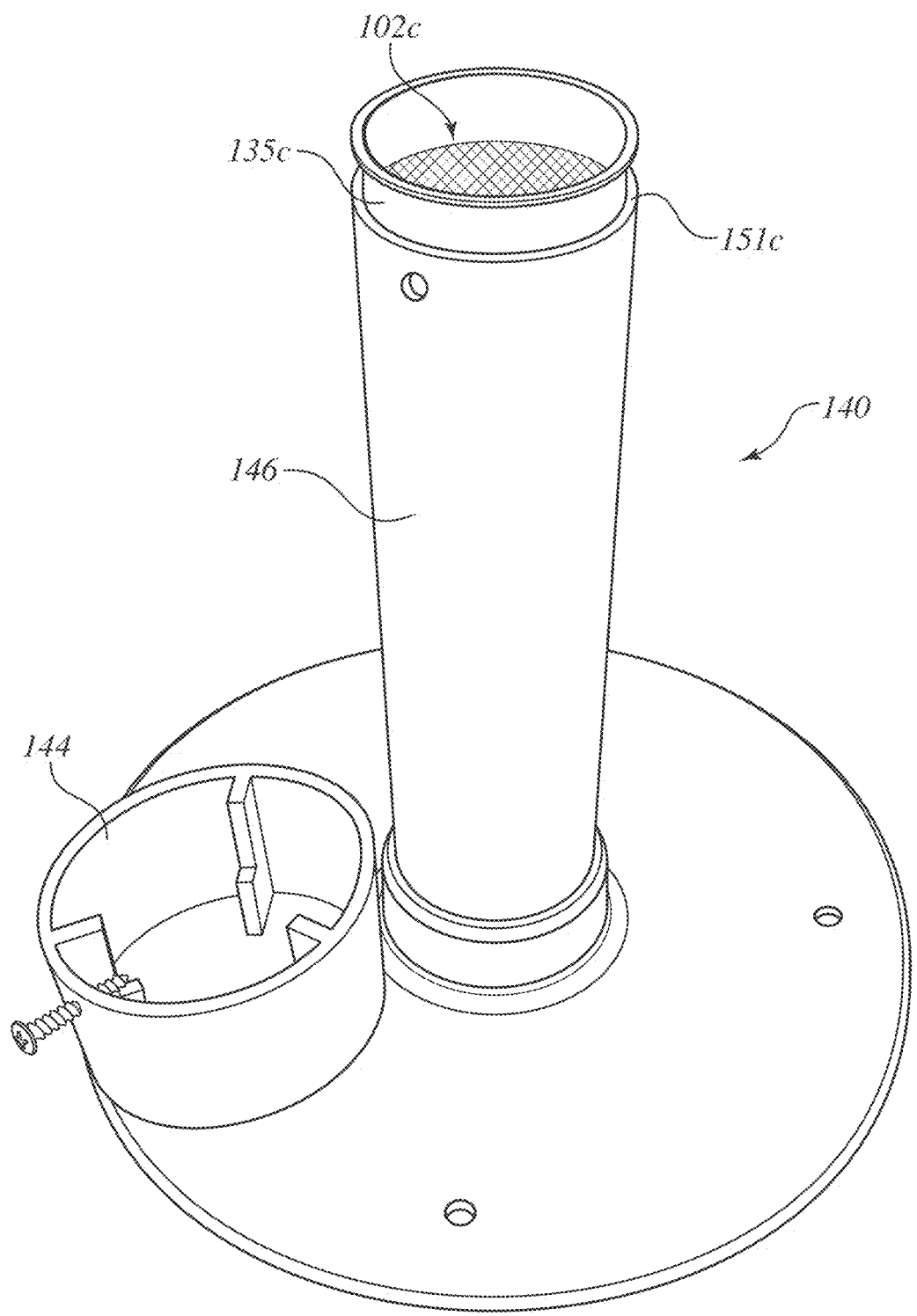
FIG. 10C illustrates the roof vent of FIG. 10A with cover off according to an exemplary embodiment.

Roof vents 140 can be covered after roof electrostatic charged screens 102b are installed, such as after roof electrostatic charged screens 102b are pressure fit to roof vents 140. For example, cover 144 can be placed over roof vents 140, as shown in FIG. 10B, according to an exemplary embodiment. In some embodiments, cover 144 prevents rain from reaching the roof vent 140, while still fluidly coupling interior 12 (FIGS. 11-12) of mausoleum 10 and an ambient exterior of mausoleum 10.

Figure 9B:
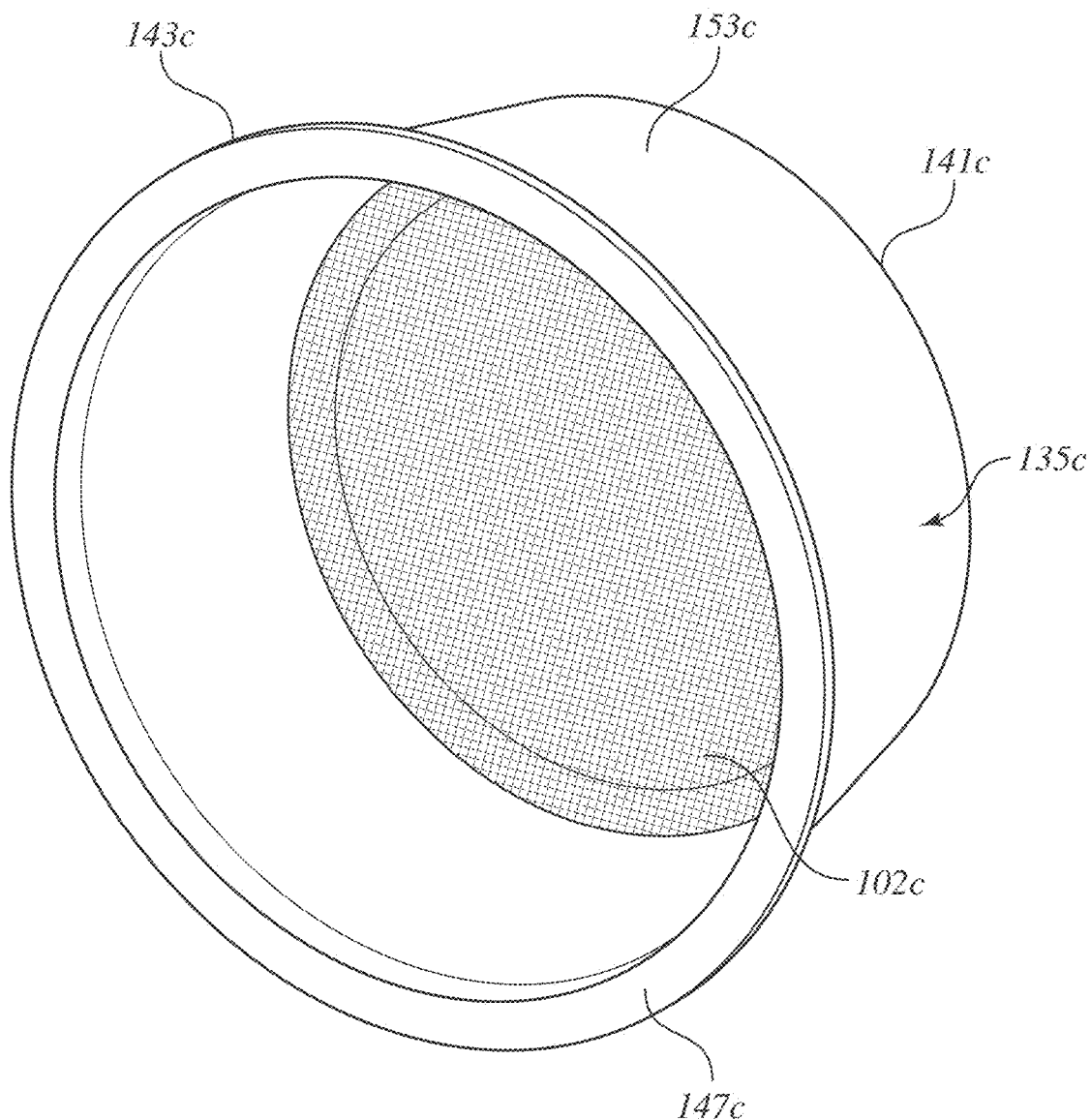
FIG. 9B illustrates a roof electrostatic charged screen according to an exemplary embodiment.

In certain embodiments, a roof electrostatic charged screens 102c may be circular and fitted in a screen housing 135c, as shown in FIG. 9B and have a similar structure as crypt electrostatic charged screen 102a other than its relative size. In some embodiments, housing 135c may have a cup shape with a frustoconical shaped side wall 153c. Screen housing 135c may include a smaller-diameter closed base end 141c for receiving a roof electrostatic charged screen 102c opposing a larger-diameter open upper end 143c having an annular flange 147c. In certain embodiments, fitting each of the roof electrostatic charged screens 102c to roof vents 140 may include inserting screen housing 135c, base end 141c first, within roof vent 140 such that annular flange 147c is adjacent an end 151c of roof vent 140, as shown in FIG. 10B. In certain embodiments, roof electrostatic charged screen 102c may have a diameter of approximately two inches, and frame 135c may have a depth of approximately one inch.

As discussed above, insecticide 120 (FIG. 2) can have an effective use period of about six to eight months. Accordingly, in some embodiments, roof electrostatic charged screen 102b, 102c can be replaced with another roof electrostatic charged screen 102b, 102c after about six to eight months. In other words, a replacement roof electrostatic charged screen 102b, 102c can be applied with insecticide 120. The replacement roof electrostatic charged screen 102b, 102c can fitted to roof vent 140. Roof electrostatic charged screen 102b, 102c can be removed from roof vent 140 and the replacement roof electrostatic charged screen 102b, 102c can be fitted to roof vent 140.

In some embodiments, roof vents 140 (FIGS. 9A-10C), crypt vents 134 (FIGS. 6-8B), and crypt drains 139 (FIGS. 11-12) can be fluidly coupled. Accordingly, air can travel from crypt vents 134 and crypt drains 139 to roof vents 140, and in some embodiments one or more of roof vents 140 (FIGS. 9A-10C), crypt vents 134 (FIGS. 6-8B), and crypt drains 139 (FIGS. 11-12) include a crypt electrostatic charged screen 102a including insecticide 120 (FIG. 2).

An arrangement of roof vents 140, crypt vents 134, and crypt drains 139 is shown in FIG. 11, according to an exemplary embodiment. As shown, a poured-in-place mausoleum 10 can include a plurality of crypts 124 in interior 12. The plurality of crypts can be arranged in rows, such as a first row 126 and a second row 128. Crypts 124 of first row 126 can be adjacent crypts 124 of second row 128. First row 126 can include between about four crypts 124 and about 10 crypts 124, such as between about five crypts 124 and about eight crypts 124, such as about six crypts 124. Similarly, second row 128 can include between about four crypts 124 and about 10 crypts 124, such as between about five crypts 124 and about eight crypts 124, such as about six crypts 124. Between about one roof vent 140 and about four roof vents, such as about two roof vents can be disposed between crypts 124 of first row 126 and crypts 124 of second row 128.

Crypts 124 can include crypt vents 134. Crypt vents 134 of crypts 124 of first row 126 can be positioned on sides 130 of crypts 124 to face crypts 124 of second row 128. Similarly, crypt vents 134 of crypts 124 of second row 128 can be positioned on sides 130 of crypts 124 to face crypts 124 of first row 126. Crypts 124 can also include crypt drains 139. Crypt drains 139 of crypts 124 of first row 126 can be positioned on sides 130 of crypts 124 to face crypts 124 of second row 128. Similarly, crypt drains 139 of crypts 124 of second row 128 can be positioned on sides 130 of crypts 124 to face crypts 124 of first row 126.

Crypt vents 134 and roof vents 140 can be coupled through a series of pipes 146. As shown, pipes 146, such as polyvinyl chloride (PVC) piping, can be disposed between first row 126 and second row 128 in an area 16. Pipes can extend from ground 22 to roof 20 in area 16. Pipes 146 can be coupled to crypt vents 134 and roof vents 140 such that air from the interior of crypts 124 can exit through roof vents 140. In certain embodiments, roof vents 140, which are fluidly coupled to the interior of crypts 124 via crypt vents 134, are configured to eliminate phorid flies by receiving roof electrostatic charged screens 102, 102b (FIGS. (9A-10C) having insecticide 120 (FIG. 2), as discussed above.

Similarly, crypt drains 139 and roof vents 140 can be coupled through a series of pipes 146. Pipes 146 can be coupled to crypt drains 139 and roof vents 140 such that roof vents 140 and crypt drains 139 are fluidly coupled and air from the interior of crypts 124 can exit through roof vents 140.

Mausoleum 10 may be a precast building and can additionally or alternatively include an arrangement of roof vents 140, crypt vents 134, and crypt drains 139 shown in FIG. 12, according to an exemplary embodiment. As shown, each crypt vent 134 can be positioned at a rear 132 of each crypt 124. Additionally, each crypt drain 139 can be positioned at rear 132 of each crypt 124. Crypt vent 134 and crypt drain 139 can be fluidly coupled to interior 12 via a plenum, or open area, 14 behind crypts 124. Roof vents 140 can be fluidly coupled to interior 12 at plenum 14 to fluidly couple to the interior of crypts 124 and allow air from the interior of crypts 124 to exit through roof vents 140.

Figure 13:
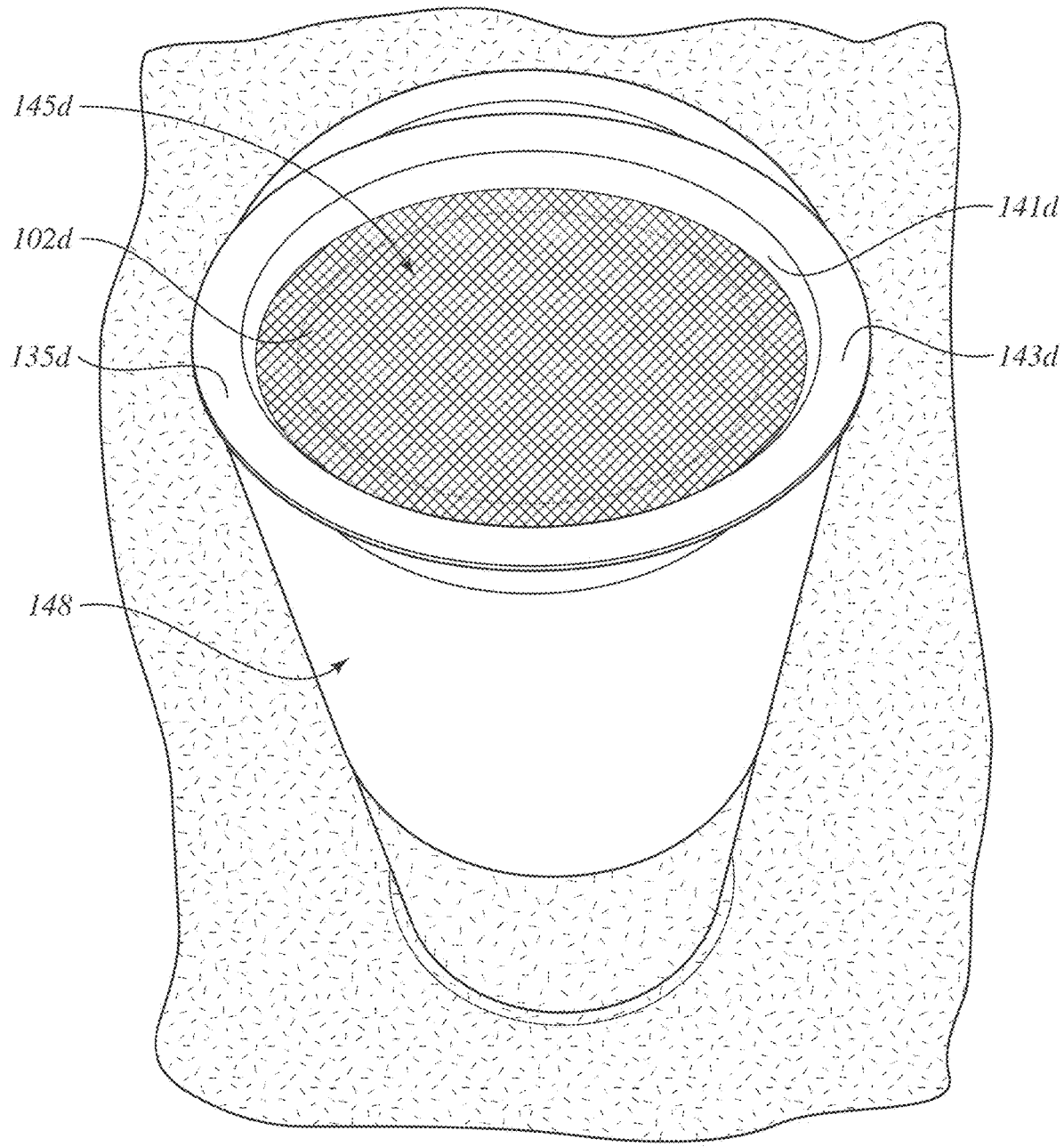
FIG. 13 illustrates a floor drain and a drain electrostatic charged screen according to an exemplary embodiment.
Figure 14:
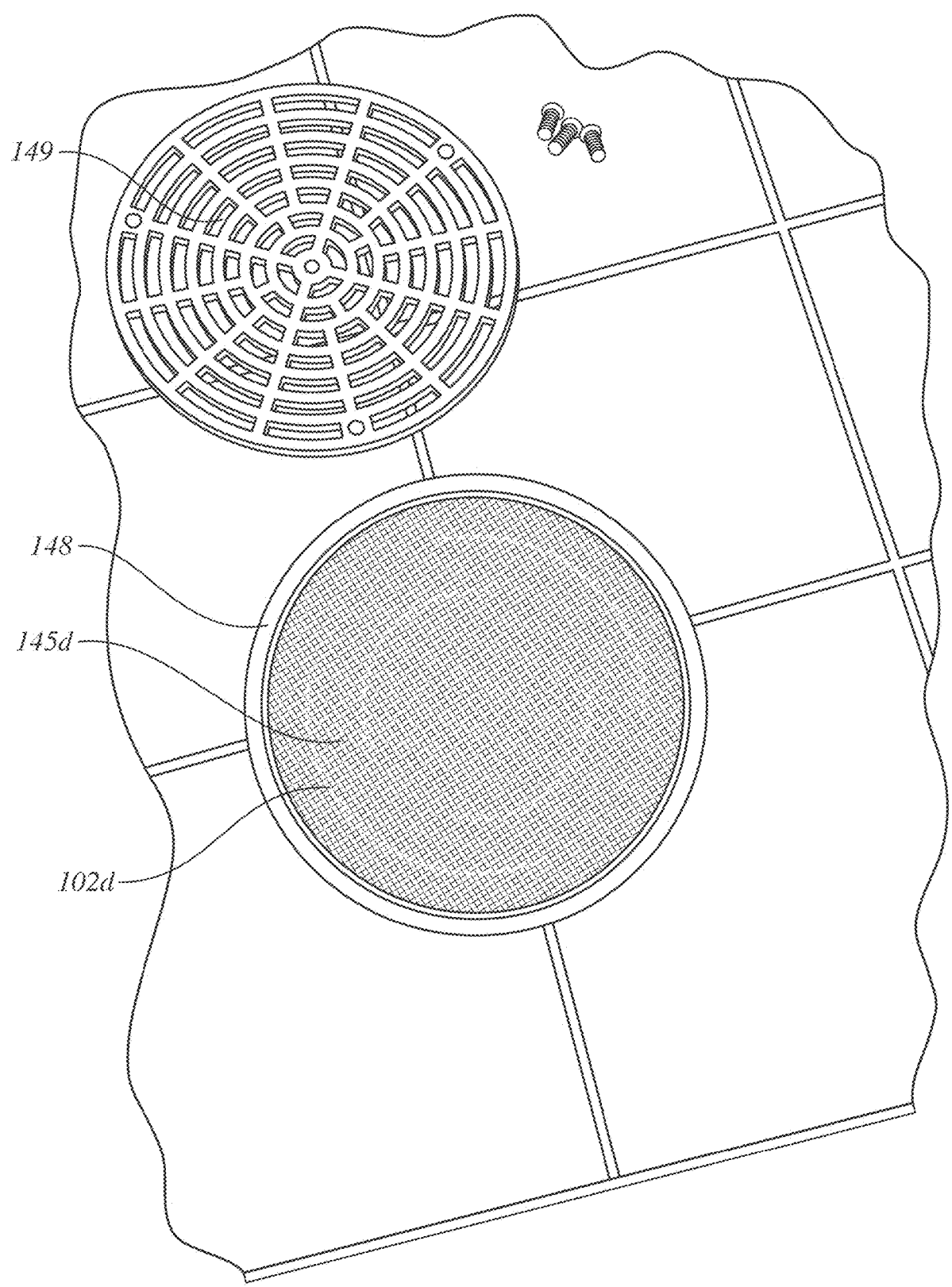
FIG. 14 illustrates a floor drain and a cover according to an exemplary embodiment.
Figure 15:
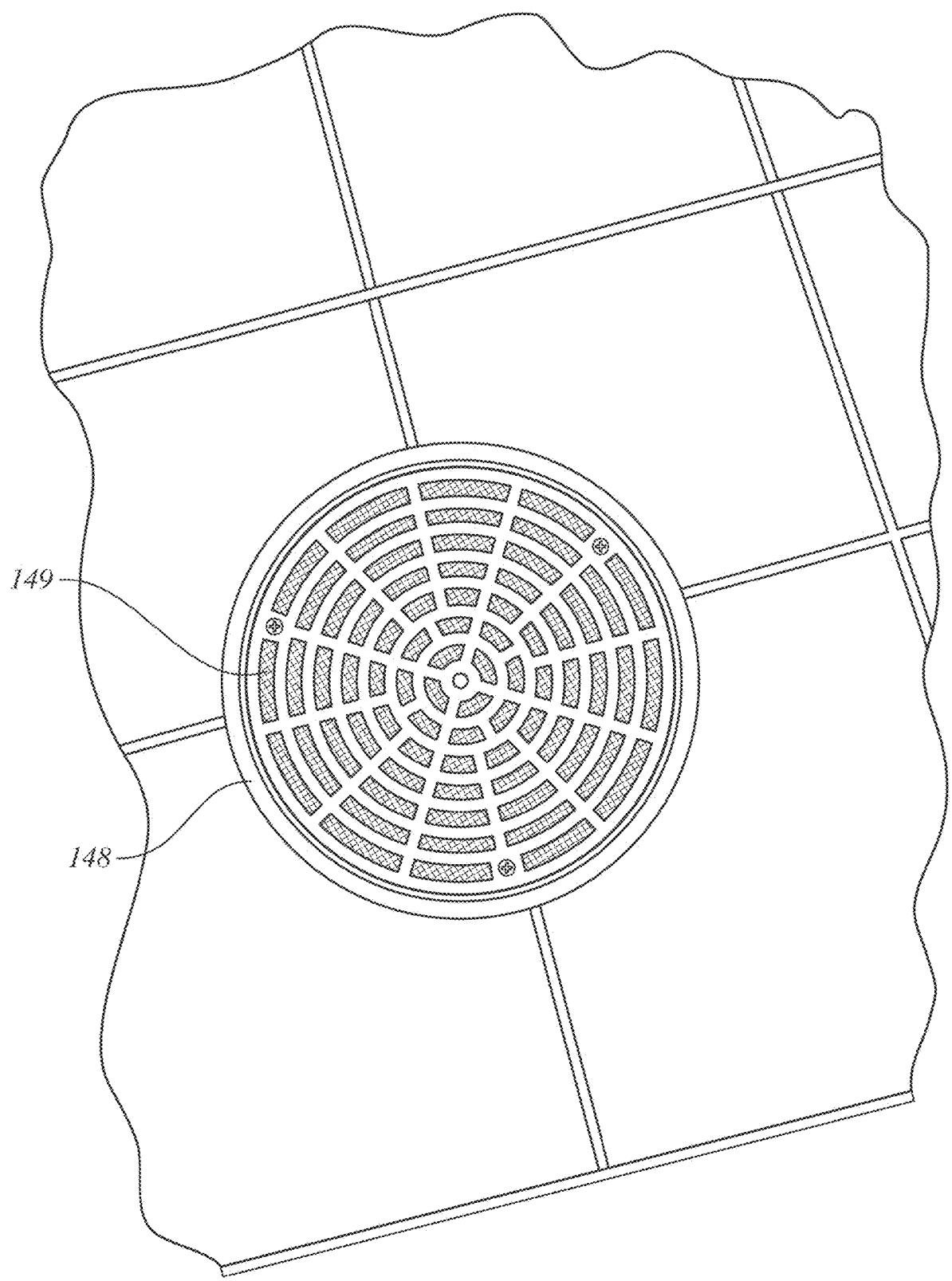
FIG. 15 illustrates the floor drain and the cover of FIG. 14.

In certain embodiments, in addition to, or alternatively to roof vents 140, crypt vents 134, and crypt drains 139, mausoleum 10 can include various other openings. With reference to FIGS. 13-15, mausoleum 10 (FIGS. 11-12) can include a floor drain 148. Floor drains 148 can be formed on floors of restrooms, for example. As with exterior windows 110 (FIGS. 4-5, 11), roof vents 140 (FIGS. 9A-10C), crypt vents 134 (FIGS. 6-8B), and crypt drains 139 (FIGS. 11, 12), floor drains 148 can include insecticide 120 (FIG. 2) to eliminate phorid flies. For example, insecticide 120 can be applied to a drain electrostatic charged screen 102d, similar to applying insecticide 120 to window electrostatic charged screens 100, discussed above. Drain electrostatic charged screen 102d can be shaped to fit the shape of floor drain 148. Drain electrostatic charged screen 102d can be fit to an opening in floor drain 148, such that screen 102d covers the entire drain 148. A drain cover 149 can be placed over floor drain 148 to secure electrostatic charged screen 102d. Drain electrostatic charged screen 102d can be framed to facilitate fitting each of the drain electrostatic charged screen 102d to floor drain 148. In addition, in some embodiments, each drain electrostatic charged screen 102d can include a screen housing 135d that receives a drain electrostatic charged screen 102d (FIG. 13) utilizing the same method as the crypt vents 134 discussed above. Frame 135d can be cup shape with a frustoconical shaped side wall and can include a base end 141d opposing an upper end 143d. In floor drain 148, crypt electrostatic charged screen 102d can be disposed at base end 141d of frame 135d. In this way, frame 135d can include a receiving portion 145d between base end 141d and upper end 143d to form a drain, which can receive fluids from decomposing matter within crypts 124. In certain embodiments, drain electrostatic charged screen 102d may have a diameter of approximately six inches, and frame 135d may have a depth of approximately 0.25 to 0.5 inches.

Any other openings in mausoleum 10 (FIGS. 11-12), such as sink openings, other air vents, etc. can be configured to receive insecticide 120 (FIG. 2) applied to an electrostatic charged screen, as discussed with respect to window electrostatic screens 100 (FIG. 1), crypt electrostatic screens 102 (FIGS. 7, 9), roof electrostatic screens 102b (FIG. 11), and drain electrostatic screens 102d (FIG. 13).

Figure 16:
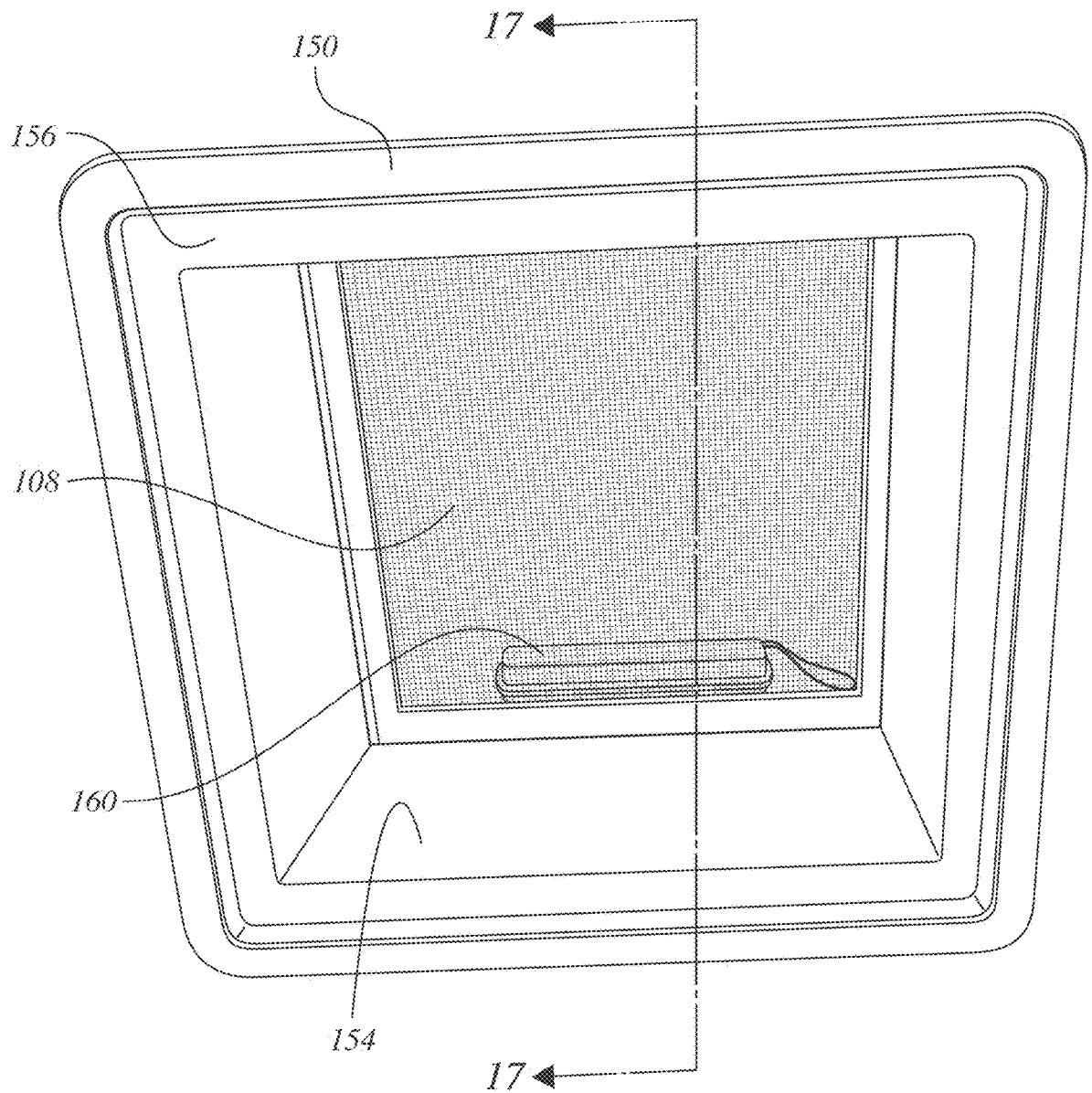
FIG. 16 illustrates a container unit according to an exemplary embodiment.
Figure 17:
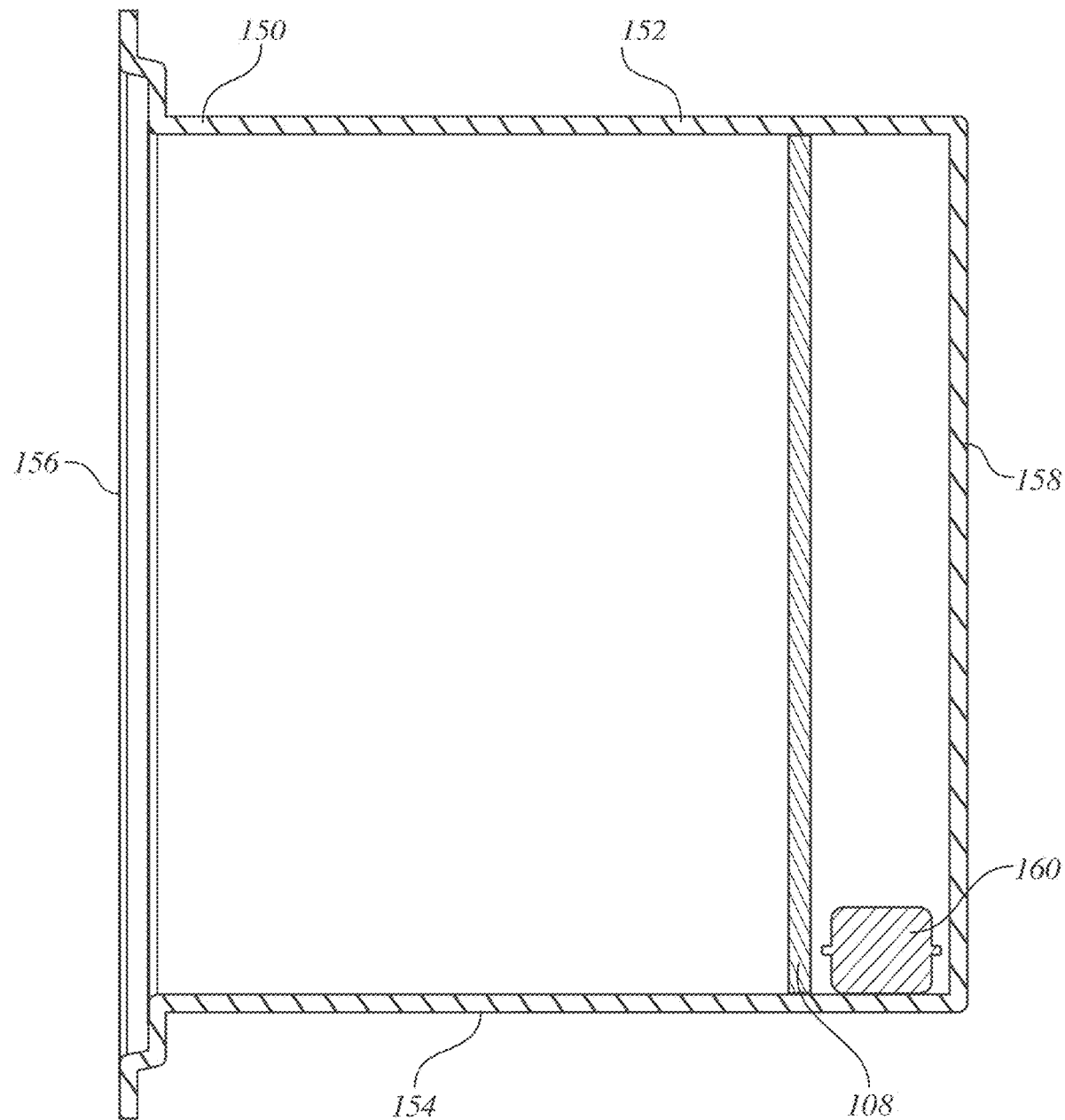
FIG. 17 illustrates the container unit of FIG. 16 along line 17-17.

In some embodiments, additionally or alternatively to applying insecticide 120 (FIG. 2) to openings in mausoleum 10 (FIGS. 11-12), insecticide 120 can be applied within interior 12 (FIGS. 11-12) in standalone units. Interior 12 can include at least one of a corridor, a chapel area, an area comprising a crypt chamber, and an area comprising a window, and an area not comprising a window. A container unit 150 is shown in FIGS. 15-16, according to an exemplary embodiment. As shown, container unit 150 can be cube-shaped.

Embodiments including a method for creating a network of insecticide-treated electrostatic screens can utilize one or more container units 150, each container unit 150 formed as follows. The method can include applying insecticide 120 (FIG. 2) to container unit electrostatic charged screen 108, similar to applying insecticide 120 to window electrostatic charged screens 100, discussed above. In certain embodiments, the method can also include placing a UV light 160, or other light source, inside container unit 150. In some embodiments, UV light 160 can be corded. Accordingly, container unit 150 may be placed near a power source. Additionally or alternatively, UV light 160 can be battery-powered.

In some embodiments, the method can also include placing container unit electrostatic charged screen 108' in container unit 150. As shown in FIG. 16, container unit 150 can include an upper wall 152, a lower wall 154 opposing upper wall 152, a front wall 156, and a back wall 158 opposing front wall 156. Container unit 150 can be substantially enclosed. In other words, container unit 150 can include an opening in only front wall 156. In other embodiments, container unit 150 can include an additional opening in back wall 158 and/or other walls. Container unit electrostatic charged screen 108 can be disposed in container unit 150 such that phorid flies can enter container unit 150 through the one or more openings of container unit 150 and contact container unit electrostatic charged screen 108. In certain embodiments, all openings are covered by electrostatic charged screen 108 with insecticide 120.

In some embodiments, container unit electrostatic charged screen 108 can be placed between about two inches and about eight inches, such as about five inches from back wall 158. UV light 160 can be placed behind container unit electrostatic charged screen 108. UV light 160 can be disposed on lower wall 154. Alternatively UV light 160 can be attached to upper wall 152.

Container unit 150 can be placed in mausoleum 10 (FIGS. 11-12) and installed in interior 12 (FIGS. 11-12) of mausoleum 10. For example, container unit 150 can be placed in areas of interior 12 with significant phorid fly activity. Significant phorid fly activity can occur when between about two and about 10 phorid flies, such as between about three and about five phorid flies congregate in interior 12. Container 150 can include an opening in front wall 156 or other walls to allow phorid flies to enter container 150. UV light 160 can facilitate attracting phorid flies to container unit 150.

Embodiments provide a method for minimizing phorid fly activity inside a mausoleum building. The method can include applying an insecticide to a first electrostatic charged screen. The method can also include shaping the first electrostatic charged screen to a first exterior window of the mausoleum building. The method can also include installing the first electrostatic charged screen to the inside of the first exterior window of the mausoleum building. In some embodiments, the insecticide is a crystalline insecticide dust. In some embodiments, the insecticide is in a powdered form. The insecticide can adhere to the first electrostatic charged screen. In some embodiments, applying the insecticide to the first electrostatic charged screen includes preparing a container filled with the insecticide; and inserting the first electrostatic charged screen into the container. In some embodiments, the container is larger than the first electrostatic charged screen. In some embodiments, the first electrostatic charged screen is pre-charged. In some embodiments, the first electrostatic charged screen includes a polyester fiber. In some embodiments, the first electrostatic charged screen includes a polyethylene terephthalate resin. In some embodiments, the first electrostatic charged screen to the first exterior window of the mausoleum building includes laser cutting the first electrostatic charged screen. In some embodiments, the first electrostatic charged screen is smaller than the first exterior window.

In some embodiments, the method also includes attaching a first frame to an outer perimeter of the first electrostatic charged screen. In some embodiments, the method also includes attaching a fastener to the first frame. Installing the first electrostatic charged screen to the first exterior window of the mausoleum building can include attaching the fastener to the first exterior window. In some embodiments, the fastener includes a suction cup.

In some embodiments, the method also includes applying the insecticide to a second electrostatic charged screen. The method can include shaping the second electrostatic charged screen to a second exterior window of the mausoleum building. The method can include installing the second electrostatic charged screen to the inside of the second exterior window of the mausoleum building. In some embodiments, the method also includes attaching a second frame to an outer perimeter of the second electrostatic charged screen. In certain embodiments, the first exterior window and the second exterior window can be no more than between about 10 feet and about 20 feet apart. In some embodiments, the method also includes applying the insecticide to a plurality of electrostatic charged screens, the first electrostatic charged screen being one of the plurality of electrostatic charged screens. The method can also include installing each of the plurality of electrostatic charged screens in an interior of the mausoleum building such that each of the plurality of electrostatic charged screens is no more than between about 10 feet to about 20 feet apart.

Embodiments provide a method for minimizing phorid fly activity. The method can include applying an insecticide to a plurality of first electrostatic charged screens. The method can also include fitting each of the first electrostatic charged screens to a crypt vent in each of a plurality of crypts arranged in an interior of a mausoleum. The crypt vents can fluidly couple interiors of the plurality of crypts and the interior of the mausoleum. The method can also include applying the insecticide to a plurality of second electrostatic charged screens. The method can also include fitting each of the second electrostatic charged screens to each of a plurality of roof vents of the mausoleum. The roof vents can fluidly couple the interior of the mausoleum and an ambient exterior of the mausoleum.

In some embodiments, the method also includes shaping the plurality of first electrostatic charged screens to fit the shapes of the crypt vents in each of the plurality of crypts. In some embodiments, the method also includes shaping the plurality of second electrostatic charged screens to fit the shapes of each of the plurality of roof vents. In some embodiments, the method also includes placing a cover over each of the plurality of second electrostatic charged screen fit to each of the plurality of roof vents.

In some embodiments, the method also includes applying the insecticide to a plurality of third electrostatic charged screens. The method also includes shaping the plurality of third electrostatic charged screens to fit the shapes of a plurality of floor drains of the mausoleum building. The method also includes fitting the plurality of third electrostatic charged screens to an opening in each of the plurality of floor drains.

In some embodiments, fitting each of the second electrostatic charged screens to each of the plurality of roof vents includes pressure fitting each of the second electrostatic charged screens to an opening in each of the plurality of roof vents. In some embodiments, the method also includes attaching a fastener to each of the plurality of first electrostatic charged screens. Fitting each of the first electrostatic charged screens to each of the plurality of crypt vents can include attaching the fastener to each of the plurality of crypt vents. In some embodiments, the fastener includes an adhesive. In some embodiments, the lifespan of the insecticide is about six to eight months. In some embodiments, the method also includes replacing the second electrostatic charged screen with a fourth electrostatic charged screen after about six to eight months.

In some embodiments, the method also includes applying the insecticide to a plurality of fourth electrostatic charged screens. The method can include shaping the plurality of fourth electrostatic charged screens to fit the shapes of each of the plurality of roof vents. The method can removing the plurality of second electrostatic charged screens from the plurality of roof vents after about six to eight months. The method can include fitting each of the fourth electrostatic charged screens to each of a plurality of roof vents. In some embodiments, the crypt vent in each of the plurality of crypts is positioned at a rear of each of the plurality of crypts.

In some embodiments, the plurality of crypts is arranged in rows including a first row and a second row. Crypts of the first row can be adjacent crypts of the second row. The crypt vents of the crypts of the first row can be positioned to face the crypts of the second row. The crypt vents of the crypts of the second row can be positioned to face the crypts of the first row. In some embodiments, about six crypts include the crypts of the first row. In some embodiments, about two roof vents can be disposed between the crypts of the first row and the crypts of the second row.

In some embodiments, each of the plurality of crypts includes a crypt drain. The crypt drains can fluidly couple interiors of the plurality of crypts and the interior of the mausoleum. In some embodiments, the crypt vents and the plurality of roof vents are coupled through a series of pipes.

Embodiments provide a method for creating a network of insecticide-treated electrostatic screens. The method can include applying an insecticide to a first electrostatic charged screen. The method can also include placing a first ultraviolet (UV) light in a first container unit. The method can also include placing the first electrostatic charged screen in first container unit. The method can also include placing the first container unit in a mausoleum building. The method can also include installing the first container unit in an interior area of the mausoleum building.

In some embodiments, the method can also include applying an insecticide to a second electrostatic charged screen. The method can also include placing the second electrostatic charged screen and a second UV light in a second container unit. The method can also include installing the second container unit in a second interior area of the mausoleum building. In some embodiments, the first electrostatic charged screen is about five inches from a back wall of the first container unit.

In some embodiments, the first UV light is placed behind the first electrostatic charged screen in the first container unit such that the first UV light is intermediate to the first electrostatic charged screen and a back wall of the first container unit. In some embodiments, the first UV light is attached to an upper wall of the first container unit. In some embodiments, the first container unit includes an opening at a front end of the first container unit. In some embodiments, the insecticide is an Environmental Protection Agency (EPA) minimum-risk botanical insecticide. In some embodiments, the interior area includes a corridor of the mausoleum building. In some embodiments, the interior area includes a chapel area of the mausoleum building. In some embodiments, the interior area includes an area in a crypt chamber of the mausoleum building. In some embodiments, the interior area includes a window of the mausoleum building. In some embodiments, the UV light is corded.

It will be recognized that while certain embodiments of the disclosure are described in terms of a specific sequence of steps of a method, these descriptions are only illustrative of the broader methods of the disclosure, and can be modified as required by the particular application. Certain steps can be rendered unnecessary or optional under certain circumstances. Additionally, certain steps or functionality can be added to the disclosed embodiments, or the order of performance of two or more steps permuted. All such variations are considered to be encompassed within the disclosure disclosed and claimed herein.

While the disclosure has been illustrated and described in detail in the drawings and foregoing description, such illustration and description are to be considered illustrative or exemplary and not restrictive. The disclosure is not limited to the disclosed embodiments. Variations to the disclosed embodiments and/or implementations can be understood and effected by those skilled in the art in practicing the claimed disclosure, from a study of the drawings, the disclosure and the appended claims.

It should be noted that the use of particular terminology when describing certain features or embodiments of the disclosure should not be taken to imply that the terminology is being re-defined herein to be restricted to include any specific characteristics of the features or embodiments of the disclosure with which that terminology is associated. Terms and phrases used in this application, and variations thereof, especially in the appended claims, unless otherwise expressly stated, should be construed as open-ended as opposed to limiting. As examples of the foregoing, the term "including" should be read to mean "including, without limitation," "including but not limited to," or the like; the term "comprising" as used herein is synonymous with "including," "containing," or "characterized by," and is inclusive or open-ended and does not exclude additional, unrecited elements or method steps; the term "having" should be interpreted as "having at least"; the term "such as" should be interpreted as "such as, without limitation"; the term "includes" should be interpreted as "includes but is not limited to"; the term "example" is used to provide exemplary instances of the item in discussion, not an exhaustive or limiting list thereof, and should be interpreted as "example, but without limitation"; adjectives such as "known," "normal," "standard," and terms of similar meaning should not be construed as limiting the item described to a given time period or to an item available as of a given time, but instead should be read to encompass known, normal, or standard technologies that can be available or known now or at any time in the future; and use of terms like "preferably," "preferred," "desired," or "desirable," and words of similar meaning should not be understood as implying that certain features are critical, essential, or even important to the structure or function of the present disclosure, but instead as merely intended to highlight alternative or additional features that can or cannot be utilized in a particular embodiment.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should be read as "and/or" unless expressly stated otherwise. The terms "about" or "approximate" and the like are synonymous and are used to indicate that the value modified by the term has an understood range associated with it, where the range can be ±20%, ±15%, ±10%, ±5%, or ±1%. The term "substantially" is used to indicate that a result (e.g., measurement value) is close to a targeted value, where close can mean, for example, the result is within 80% of the value, within 90% of the value, within 95% of the value, or within 99% of the value. Also, as used herein "defined" or "determined" can include "predefined" or "predetermined" and/or otherwise determined values, conditions, thresholds, measurements, and the like.

What is claimed is:

1. A method for minimizing phorid fly activity, comprising:
    applying an insecticide to a plurality of first electrostatic charged screens; and
    fitting each of the first electrostatic charged screens to a crypt vent in each of a plurality of crypts arranged in an interior of a mausoleum, the crypt vents configured to fluidly couple interiors of the plurality of crypts and the interior of the mausoleum.

2. The method of claim 1, further comprising:
    applying the insecticide to a plurality of second electrostatic charged screens; and
    fitting each of the second electrostatic charged screens to each of a plurality of roof vents of the mausoleum, the roof vents configured to fluidly couple the interior of the mausoleum and an ambient exterior of the mausoleum; and
    placing a cover over each of the plurality of second electrostatic charged screens fit to each of the plurality of roof vents.

3. The method of claim 2, wherein fitting each of the first electrostatic charged screens to a crypt vent further comprises fitting each of the first electrostatic charged screens into an end of a first screen housing comprising a first frustoconical shaped side wall, and inserting the first screen housing into the crypt vent.

4. The method of claim 3, wherein fitting each of the second electrostatic charged screens to a roof vent further comprises fitting each of the second electrostatic charged screens into an end of a second screen housing comprising a second frustoconical shaped side wall, and inserting the second screen housing into the roof vent.

5. The method of claim 4, further comprising:
    applying the insecticide to a plurality of third electrostatic charged screens;
    fitting each of the third electrostatic charged screens to a crypt drain in each of the plurality of crypts, the crypt drains configured to fluidly couple with the plurality of crypt vents;
    wherein fitting each of the third electrostatic charged screens to a crypt drain further comprises fitting each of the third electrostatic charged screens into an end of a third screen housing comprising a third frustoconical shaped side wall, and inserting the third screen housing into the crypt drain.

6. The method of claim 5, further comprising:
    applying the insecticide to a plurality of fourth electrostatic charged screens;
    fitting the plurality of fourth electrostatic charged screens to an opening in each of a plurality of floor drains of the mausoleum building;
    wherein fitting each of the fourth electrostatic charged screens to a floor drain further comprises fitting each of the fourth electrostatic charged screens into an end of a fourth screen housing comprising a fourth frustoconical shaped side wall and a fluid receiving portion, and inserting the fourth screen housing into the floor drain.

7. The method of claim 6, replacing the second electrostatic charged screen with a fifth electrostatic charged screen after about six to eight months, wherein the lifespan of the insecticide is about six to eight months.

8. A method for minimizing phorid fly activity inside a mausoleum building, comprising:
    applying an insecticide to a first electrostatic charged screen;
    shaping the first electrostatic charged screen to a first exterior window of the mausoleum building; and
    installing the first electrostatic charged screen to the inside of the first exterior window of the mausoleum building.

9. The method of claim 8, wherein the insecticide is a powered insecticide configured to adhere to the first electrostatic charged screen.

10. The method of claim 8, wherein applying the insecticide to the first electrostatic charged screen comprises:
preparing a container filled with the insecticide; and
inserting the first electrostatic charged screen into the container,
wherein the container is larger than the first electrostatic charged screen.

11. The method of claim 8, wherein the first electrostatic charged screen is pre-charged.

12. The method of claim 8, wherein the first electrostatic charged screen comprises a material selected from the group consisting of a polyester fiber, a polyethylene terephthalate resin, and combinations thereof.

13. The method of claim 8, further comprising:
attaching a first frame to an outer perimeter of the first electrostatic charged screen;
and attaching a fastener to the first frame,
wherein installing the first electrostatic charged screen to the first exterior window of the mausoleum building comprises attaching the fastener to the first exterior window.

14. The method of claim 13, wherein the fastener comprises a suction cup.

15. The method of claim 13, further comprising:
applying the insecticide to a second electrostatic charged screen;
attaching a second frame to an outer perimeter of the second electrostatic charged screen
shaping the second electrostatic charged screen to a second exterior window of the mausoleum building; and
installing the second electrostatic charged screen to the inside of the second exterior window of the mausoleum building;
wherein the first exterior window and the second exterior window are no more than between about 10 feet and about 20 feet apart.

16. A method for creating a network of insecticide-treated electrostatic screens, comprising:
applying an insecticide to a first electrostatic charged screen;
placing a first ultraviolet (UV) light in a first container unit;
placing the first electrostatic charged screen in the first container unit;
placing the first container unit in a mausoleum building; and
installing the first container unit in an interior area of the mausoleum building.

17. The method of claim 16, further comprising:
applying an insecticide to a second electrostatic charged screen;
placing the second electrostatic charged screen and a second UV light in a second container unit; and
installing the second container unit in a second interior area of the mausoleum building.

18. The method of claim 16, wherein the first UV light is placed behind the first electrostatic charged screen in the first container unit such that the first UV light is intermediate to the first electrostatic charged screen and a back wall of the first container unit, wherein the first container unit comprises an opening at a front end of the first container unit.

19. The method of claim 16, wherein the insecticide is an Environmental Protection Agency (EPA) minimum-risk botanical insecticide.

20. The method of claim 16, wherein the interior area is selected from the group consisting of a corridor of the mausoleum building, a chapel area of the mausoleum building, an area in a crypt chamber of the mausoleum building, and a window of the mausoleum building.

* * * * *